US009352309B2

(12) United States Patent
Sydora

(10) Patent No.: US 9,352,309 B2
(45) Date of Patent: May 31, 2016

(54) OLIGOMERIZATION CATALYST SYSTEM AND PROCESS FOR OLIGOMERIZING OLEFINS

(75) Inventor: Orson L. Sydora, Houston, TX (US)

(73) Assignee: Chevron Phillips Chemical Company LP, The Woodlands, TX (US)

( * ) Notice: Subject to any disclaimer, the term of this patent is extended or adjusted under 35 U.S.C. 154(b) by 1407 days.

(21) Appl. No.: 12/609,272

(22) Filed: Oct. 30, 2009

(65) Prior Publication Data

US 2010/0113852 A1 May 6, 2010

Related U.S. Application Data

(60) Provisional application No. 61/110,396, filed on Oct. 31, 2008, provisional application No. 61/110,407, filed on Oct. 31, 2008, provisional application No. 61/110,476, filed on Oct. 31, 2008.

(51) Int. Cl.

| C07C 2/24 | (2006.01) |
| B01J 31/02 | (2006.01) |
| C08F 4/42 | (2006.01) |
| B01J 31/34 | (2006.01) |
| B01J 21/02 | (2006.01) |
| B01J 31/12 | (2006.01) |
| C07C 2/30 | (2006.01) |
| C08F 10/00 | (2006.01) |
| B01J 31/14 | (2006.01) |

(52) U.S. Cl.
CPC ............ *B01J 31/122* (2013.01); *B01J 31/0237* (2013.01); *B01J 31/0239* (2013.01); *B01J 31/0244* (2013.01); *B01J 31/143* (2013.01); *B01J 2231/20* (2013.01); *B01J 2531/62* (2013.01); *Y02P 20/582* (2015.11); *Y10S 585/903* (2013.01)

(58) Field of Classification Search
None
See application file for complete search history.

(56) References Cited

U.S. PATENT DOCUMENTS

| 2,935,495 A | 5/1960 | Kennedy |
| 3,100,764 A | 8/1963 | Jezl et al. |
| 3,231,550 A | 1/1966 | Manyik et al. |
| 3,242,099 A | 3/1966 | Manyik et al. |
| 3,300,458 A | 1/1967 | Manyik et al. |
| 3,347,840 A | 10/1967 | Manyik et al. |
| 3,534,006 A | 10/1970 | Kamaishi et al. |
| 3,558,676 A | 1/1971 | Doherty et al. |
| 3,635,869 A | 1/1972 | Steele et al. |
| 3,819,746 A | 6/1974 | Katzakian, Jr. et al. |
| 3,838,101 A | 9/1974 | Steele et al. |
| 3,873,602 A | 3/1975 | Katzakian, Jr. et al. |
| 3,932,285 A | 1/1976 | Ceprini et al. |
| 3,962,182 A | 6/1976 | Steele et al. |
| 3,968,135 A | 7/1976 | Steele et al. |
| 3,977,996 A | 8/1976 | Katzakian, Jr. et al. |
| 3,978,026 A | 8/1976 | Katzakian, Jr. et al. |
| 4,017,429 A | 4/1977 | Steele et al. |
| 4,224,181 A | 9/1980 | Langer, Jr. |
| 4,603,184 A | 7/1986 | Sato et al. |
| 4,668,808 A | 5/1987 | Smith |
| 4,668,838 A | 5/1987 | Briggs |
| 4,716,206 A | 12/1987 | Fujita et al. |
| 4,721,762 A | 1/1988 | Commereuc et al. |
| 4,806,513 A | 2/1989 | McDaniel et al. |
| 4,814,308 A | 3/1989 | Konrad et al. |
| 5,198,563 A | 3/1993 | Reagen et al. |
| 5,288,823 A | 2/1994 | Reagan et al. |
| 5,331,070 A | 7/1994 | Pettijohn et al. |
| 5,331,104 A | 7/1994 | Reagen et al. |
| 5,340,785 A | 8/1994 | Reagen et al. |
| 5,360,879 A | 11/1994 | Reagen et al. |
| 5,376,612 A | 12/1994 | Reagen et al. |
| 5,382,738 A | 1/1995 | Reagen et al. |
| 5,393,719 A | 2/1995 | Pettijohn et al. |
| 5,399,539 A | 3/1995 | Reagen et al. |
| 5,438,027 A | 8/1995 | Reagen et al. |
| 5,451,645 A | 9/1995 | Reagen et al. |
| 5,470,926 A | 11/1995 | Reagen et al. |
| 5,523,507 A | 6/1996 | Reagen et al. |
| 5,543,375 A | 8/1996 | Lashier et al. |
| 5,563,312 A | 10/1996 | Knudsen et al. |
| 5,689,028 A | 11/1997 | Lashier et al. |
| 5,763,723 A | 6/1998 | Reagen et al. |

(Continued)

FOREIGN PATENT DOCUMENTS

| CA | 2087578 | 7/1994 |
| CA | 2619226 | 3/2006 |

(Continued)

OTHER PUBLICATIONS

An English translation of Patent CN 1256968.*
Briggs, J., Chem. Commun., Selective Trimerization of Ethylene to Hex-1-ene, J. Chem, Soc., 1989, pp. 674-675.
Hart, Robert, et al., "Synthesis and structures of metal carboxylate liquids," Shepherd Chemical Company, Mar. 23, 2009, National Meeting of the American Chemical Society.
Mehrotra, R.C. et al., "Metal Carboxylates,", Jaipur 302004, 1983, Academic Press, pp. 22-27.
Mehrotra, R.C. et al., "Metal Carboxylates,", Jaipur 302004, 1983, Academic Press, pp. 233-317.
Tille, D., Z. Anorg. Alleg. Chem., Organometal Compounds of Nitrogen Systems, 1971, 384, pp. 136-146.
Tille, D., Zeitschrift fur Naturforschung, Pyrrolylchromium Compounds, 1966, 21b, p. 1239.
International Preliminary Report on Patentability for PCT/US2009/062700 mailed May 12, 2011, The International Bureau of WIPO.
International Search Report and Written Opinion for PCT/US2009/062700, International Search Authority.

*Primary Examiner* — Yun Qian
(74) *Attorney, Agent, or Firm* — Merchant & Gould P.C.

(57) ABSTRACT

Among other things, this disclosure provides an olefin oligomerization system and process, the system comprising: a) a transition metal compound; b) a pyrrole compound having independently-selected $C_1$ to $C_{18}$ organyl groups at the 2- and 5-positions, wherein at least one of the organyl group alpha-carbon atoms attached to the 2- and 5-positions of the pyrrole compound is a secondary carbon atoms; and c) a metal alkyl. For example, the 2,5-diethylpyrrole (2,5-DEP)-based catalyst systems can afford a productivity increases over unsubstituted pyrrole catalyst systems, non-2,5-disubstituted catalyst systems, and 2,5-dimethylpyrrole (2,5-DMP) catalyst systems.

19 Claims, 2 Drawing Sheets

(56) References Cited

U.S. PATENT DOCUMENTS

| | | |
|---|---|---|
| 5,786,431 A | 7/1998 | Reagen et al. |
| 5,814,575 A | 9/1998 | Reagen et al. |
| 5,856,257 A | 1/1999 | Freeman et al. |
| 5,856,612 A | 1/1999 | Araki et al. |
| 5,859,303 A | 1/1999 | Lashier |
| 5,910,619 A | 6/1999 | Urata et al. |
| 5,919,996 A | 7/1999 | Freeman et al. |
| 5,986,153 A | 11/1999 | Kallenbach |
| 6,043,401 A | 3/2000 | Bagheri et al. |
| 6,133,495 A | 10/2000 | Urata et al. |
| 6,191,076 B1 | 2/2001 | Gee |
| 6,380,451 B1 | 4/2002 | Kreischer et al. |
| 6,455,648 B1 | 9/2002 | Freeman et al. |
| 6,521,806 B1 | 2/2003 | Tamura et al. |
| 7,045,632 B2 | 5/2006 | Small |
| 7,129,304 B1 | 10/2006 | Small et al. |
| 7,157,612 B2 | 1/2007 | Ewert et al. |
| 7,259,284 B2 | 8/2007 | Hope et al. |
| 7,268,096 B2 | 9/2007 | Small et al. |
| 7,271,121 B2 | 9/2007 | Small et al. |
| 7,297,832 B2 * | 11/2007 | Blann et al. .......... 585/527 |
| 7,309,805 B2 | 12/2007 | Hope et al. |
| 7,351,780 B2 | 4/2008 | Hope et al. |
| 7,378,537 B2 | 5/2008 | Small et al. |
| 7,384,886 B2 | 6/2008 | Knudsen et al. |
| 7,396,970 B1 | 7/2008 | Battiste |
| 7,425,661 B2 | 9/2008 | McConville et al. |
| 7,456,284 B2 | 11/2008 | Small |
| 7,476,775 B2 | 1/2009 | Kreischer |
| 8,471,085 B2 | 6/2013 | Sydora |
| 2002/0182124 A1 | 12/2002 | Woodard et al. |
| 2004/0236163 A1 | 11/2004 | Ewert et al. |
| 2005/0187391 A1 | 8/2005 | Knudsen et al. |
| 2005/0197521 A1 | 9/2005 | Kreischer |
| 2005/0222350 A1 | 10/2005 | Small et al. |
| 2005/0255987 A1 | 11/2005 | McDaniel et al. |
| 2006/0247483 A1 | 11/2006 | McConville et al. |
| 2007/0185361 A1 | 8/2007 | Buchanan et al. |
| 2007/0185364 A1 | 8/2007 | Buchanan et al. |
| 2008/0051545 A1 | 2/2008 | McDaniel et al. |
| 2008/0058534 A1 | 3/2008 | Knudsen et al. |
| 2008/0177122 A1 | 7/2008 | Knudsen et al. |
| 2008/0293899 A1 | 11/2008 | McConville et al. |

FOREIGN PATENT DOCUMENTS

| | | |
|---|---|---|
| CN | 1256968 A | 6/2000 |
| EP | 0194596 A2 | 9/1986 |
| EP | 0207220 A2 | 1/1987 |
| EP | 0416304 A2 | 3/1991 |
| EP | 0608447 A1 | 8/1994 |
| EP | 0780353 A1 | 6/1997 |
| EP | 0608447 B1 | 10/2001 |
| FR | 2253029 | 6/1975 |
| WO | WO 97/11082 A1 | 3/1997 |
| WO | WO 2006/109194 A2 | 10/2006 |

* cited by examiner

US 9,352,309 B2

OLIGOMERIZATION CATALYST SYSTEM AND PROCESS FOR OLIGOMERIZING OLEFINS

CROSS REFERENCE TO RELATED APPLICATIONS

This application claims priority to and the benefit of U.S. Provisional Patent Application No. 61/110,396 filed Oct. 31, 2008, U.S. Provisional Patent Application No. 61/110,407, filed Oct. 31, 2008, and U.S. Provisional Patent Application No. 61/110,476, filed Oct. 31, 2008. Each of these provisional patent applications is hereby incorporated by reference in its entirety.

FIELD OF THE INVENTION

This disclosure relates to an oligomerization catalyst system, methods for preparing the oligomerization catalyst system, and methods for using the oligomerization catalyst system for preparing an oligomerization product.

BACKGROUND OF THE INVENTION

The chromium-catalyzed synthesis of 1-hexene from ethylene constitutes a commercially significant process for the selective preparation of this alpha olefin, which in turn is useful for preparing a range of polyolefins when deployed as a comonomer with ethylene. A widely reported chromium catalyst system comprises chromium(III) carboxylates (e.g. tris(2-ethylhexanoate) chromium(III) ($Cr(EH)_3$), a pyrrole-containing compound, and a metal alkyl for the selective production of 1-hexene.

Many oligomerization catalyst systems contain a chromium-containing compound, a pyrrole or pyrrole-containing compound, at least one metal alkyl, optionally a solvent, and optionally additional components, which can be combined in various ways and in various ratios to afford the catalyst system. Some catalyst system preparative methods appear to rely on the presence of particular solvent to aid in the activation of the catalyst components, while other methods may rely on using an excess of a metal alkyl or other activator. Typically, any method of preparing, activating, and using a catalyst system may present challenges with respect to its particular preparation, activation, and stability, as well as to the activity and selectivity provided by the catalyst system.

Therefore, it would be useful to discover and develop new oligomerization catalyst systems, new methods for preparing the oligomerization catalyst systems, and new methods for using the oligomerization catalyst systems for preparing an oligomerization product that might provide greater efficiency and cost effectiveness. In one aspect, new oligomerization catalyst systems and methods for preparing the oligomerization catalyst systems are needed that might afford greater activity and more efficiency, and possibly lower the cost or increase the efficiency of using the chromium-based catalyst system.

SUMMARY OF THE INVENTION

Among other things, this disclosure provide for new olefin oligomerization catalyst systems, new methods for preparing the olefin oligomerization catalyst systems, and new methods for using the olefin oligomerization catalyst system for preparing an oligomerization product. In one aspect, the new oligomerization catalyst systems described here and prepared according to the various disclosed embodiments may allow for achieving good catalyst activity and selectivity.

Accordingly, one aspect of the disclosure provides for a catalyst system, in which the catalyst system can comprise:
  a) a transition metal compound;
  b) a pyrrole compound having independently-selected $C_1$ to $C_{18}$ organyl groups at the 2- and 5-positions, wherein at least one of the organyl group alpha-carbon atoms attached to the 2- and 5-positions of the pyrrole compound can be a secondary carbon atom; and
  c) a metal alkyl.

In another aspect of the disclosure provides for a catalyst system, in which the catalyst system can comprise:
  a) a transition metal compound;
  b) a pyrrole compound having independently-selected $C_2$ to $C_{18}$ organyl groups at the 2- and 5-positions, wherein the organyl group alpha-carbon atoms attached to the 2- and 5-positions of the pyrrole compound can be secondary carbon atoms; and
  c) a metal alkyl.

In yet another aspect, the catalyst system disclosed herein can comprise:
  a) a chromium compound;
  b) a pyrrole compound having independently-selected $C_1$ to $C_{18}$ organyl groups at the 2- and 5-positions, wherein at least one of the organyl group alpha-carbon atoms attached to the 2- and 5-positions of the pyrrole compound can be a secondary carbon atom; and
  c) a metal alkyl In a further aspect, the catalyst system disclosed herein can comprise:
  a) a chromium compound;
  b) a pyrrole compound having independently-selected $C_2$ to $C_{18}$ hydrocarbyl groups at the 2- and 5-positions, wherein the hydrocarbyl group alpha-carbon atoms attached to the 2- and 5-positions of the pyrrole compound can be secondary carbon atoms; and
  c) a metal alkyl.

For example, the 2,5-diethylpyrrole (2,5-DEP)-based catalyst systems can afford certain advantages over unsubstituted pyrrole catalyst systems and non-2,5-disubstituted catalyst systems. In any number of embodiments, the catalyst system according to this disclosure can further comprise a halogen-containing compound.

A further aspect of this disclosure provides for a method or process for preparing a catalyst system, the method or process comprising contacting:
  a) a transition metal compound;
  b) a pyrrole compound having independently-selected $C_1$ to $C_{18}$ organyl groups at the 2- and 5-positions, wherein at least one of the organyl group alpha-carbon atoms attached to the 2- and 5-positions of the pyrrole compound can be a secondary carbon atom; and
  c) a metal alkyl.

In another aspect of this disclosure provides for a method or process for preparing a catalyst system, the method or process comprising contacting:
  a) a transition metal compound;
  b) a pyrrole compound having independently-selected $C_2$ to $C_{18}$ organyl groups at the 2- and 5-positions, wherein the organyl group alpha-carbon atoms attached to the 2- and 5-positions of the pyrrole compound can be secondary carbon atoms; and
  c) a metal alkyl.

In still another aspect, this disclosure provides a method or process for preparing a catalyst system, the method or process comprising contacting:

a) a chromium compound;
b) a pyrrole compound having independently-selected $C_1$ to $C_{18}$ organyl groups at the 2- and 5-positions, wherein at least one of the organyl group alpha-carbon atoms attached to the 2- and 5-positions of the pyrrole compound can be a secondary carbon atom; and
c) a metal alkyl In a further aspect, this disclosure provides a method or process for preparing a catalyst system, the method or process comprising contacting:
a) a chromium compound;
b) a pyrrole compound having independently-selected $C_2$ to $C_{18}$ hydrocarbyl groups at the 2- and 5-positions, wherein the hydrocarbyl group alpha-carbon atoms attached to the 2- and 5-positions of the pyrrole compound can be secondary carbon atoms; and
c) a metal alkyl.

In any number of embodiments, the method or process for preparing a catalyst system can further comprise contacting a halogen-containing compound. In this aspect, contacting can occur in the presence or absence of a halogen-containing compound.

Other aspects of the method or process for preparing a catalyst system can include any of the following: contacting in the presence or the absence of an unsaturated hydrocarbon; contacting in the presence of the absence of 1-hexene; contacting in the presence of the absence of a solvent; or any combination of the presence or absence of any of these components.

According to a further aspect and in any embodiment, this disclosure also provides for an oligomerization process for preparing an oligomerization product, in which this process comprising oligomerizing a feedstock olefin with an oligomerization catalyst system, the catalyst system comprising:
a) a transition metal compound;
b) a pyrrole compound having independently-selected $C_1$ to $C_{18}$ organyl groups at the 2- and 5-positions, wherein at least one of the organyl group alpha-carbon atoms attached to the 2- and 5-positions of the pyrrole compound can be a secondary carbon atom; and
c) a metal alkyl.

Other catalyst systems which may be utilized in the oligomerization process are readily apparent from this disclosure. As disclosed, in one aspect the transition metal compound can be a chromium compound, and the $C_1$ to $C_{18}$ organyl groups at the 2- and 5-positions of the pyrrole compound can be $C_1$ to $C_{18}$ hydrocarbyl groups. Accordingly, in yet another aspect and in any embodiment of the present disclosure, there is provided an oligomerization process comprising:
a) contacting a feedstock olefin with the catalyst system according to any embodiment of this disclosure; and
b) oligomerizing the olefin under oligomerization conditions to form an oligomerization product.

The pyrrole compound disclosed herein can have $C_1$ to $C_{18}$ organyl groups at the 2- and 5-positions, wherein alpha-carbon atoms of at least one of the 2- and 5-organyl groups can be a secondary carbon atom; alternatively, the pyrrole compound disclosed herein can have $C_2$ to $C_{18}$ organyl groups at the 2- and 5-positions, wherein alpha-carbon atoms of the 2- and 5-organyl groups may be secondary carbon atoms. In one aspect, any $C_1$ to $C_{18}$ organyl group can be a hydrocarbyl group and in another aspect, any $C_1$ to $C_{18}$ organyl groups can be an alkyl group. As provided herein, the organyl groups at the 2- and 5-positions of the pyrrole compound can contain inert functional groups. Other substituents at the 3-position, the 4-position, or both the 3- and 4-positions of the pyrrole compound can be present or can be absent, and their presence or absence is not required. Thus, for example, the pyrrole can be 2,5-substituted, 2,3,5-substituted, 2,4,5-substituted, or 2,3,4,5-substituted, and each substituent is selected independently. Thus, according to some aspects and embodiments, the pyrrole compound can be a 2,5-disubstituted pyrrole, and in some aspects and embodiments, the pyrrole compound can be 2,5-diethyl pyrrole.

In a further aspect of this disclosure and in any embodiment, there is provided an oligomerization process comprising combining a feedstock olefin with an oligomerization catalyst system to form an oligomerization product, the oligomerization catalyst system, comprising any of the oligomerization catalyst systems disclosed herein. Thus, in some aspects and in some embodiments, the process can be an olefin trimerization process. In further aspects and embodiments, the feedstock olefin can be an alpha olefin; alternatively, the feedstock olefin can be ethylene. Moreover, in some aspects and embodiments, the process can be an olefin trimerization process and the resulting product can comprise an olefin trimer. In yet other aspects and embodiments, the process can be an ethylene trimerization process and the oligomerization product can comprises 1-hexene.

In other aspects of any of the herein mentioned embodiments, the oligomerization process according to this disclosure can provide greater product selectivity and/or trimer purities than a corresponding oligomerization process using 2,5-dimethylpyrrole as the pyrrole compound. That is, under the same conditions and using a catalyst system that differs only in the pyrrole, the oligomerization process of this disclosure can have provide greater product selectivity and/or trimer purities than a corresponding oligomerization process using 2,5-dimethylpyrrole. In another aspect, the oligomerization process according to this disclosure also can produce less polymer than the corresponding process using an oligomerization catalyst system in which the pyrrole compound is 2,5-dimethylpyrrole.

These and other aspects and embodiments of the transition metal carboxylate compositions and of the synthetic process for their preparation are described more fully in the Detailed Description and claims and further disclosure provided herein.

DETAILED DESCRIPTION OF THE INVENTION

General Description

Figure 1:
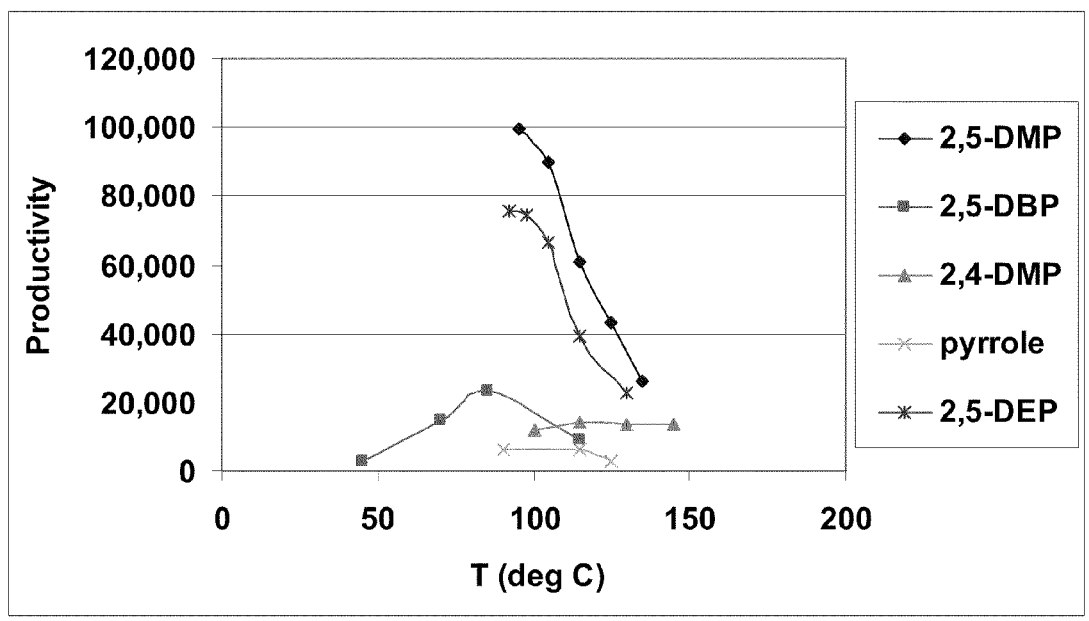
FIG. 1 illustrates a plot of the selective C6 productivities (g C6/g Cr) as a function of temperature (° C.), for chromium-based catalyst systems prepared using the following pyrroles: 2,5-dimethylpyrrole (2,5-DMP); 2,5-dibenzylpyrrole (2,5-DBP); 2,4-dimethylpyrrole (2,4-DMP); pyrrole; and 2,5-diethylpyrrole (2,5-DEP).

According to various aspects and embodiments of this disclosure, there is provided new olefin oligomerization catalyst systems, methods for their preparation, and methods for their use for preparing an olefin oligomerization product. In one aspect, the new oligomerization catalyst systems described here and prepared according to the various disclosed embodiments can allow for achieving good catalyst system activity, catalyst system productivity, product selectivity, and/or product purity by selection of the pyrrole compound or component used in the catalyst system. In another aspect, the new oligomerization catalyst systems produce low quantities of polymer.

One aspect of this disclosure provides a catalyst system comprising:
a) a transition metal compound;
b) a pyrrole compound having independently-selected $C_1$ to $C_{18}$ organyl groups at the 2- and 5-positions, wherein at least one of the organyl group alpha-carbon atoms attached to the 2- and 5-positions of the pyrrole compound can be a secondary carbon atom; and
c) a metal alkyl.

Another aspect of this disclosure provides a catalyst system comprising:
a) a transition metal compound;
b) a pyrrole compound having independently-selected $C_2$ to $C_{18}$ organyl groups at the 2- and 5-positions, wherein the organyl group alpha-carbon atoms attached to the 2- and 5-positions of the pyrrole compound can be secondary carbon atoms; and
c) a metal alkyl.

According to a further aspect, this disclosure provides for a process or method of preparing a catalyst system, the process comprising contacting components a), b), and c) recited as components of the catalyst system. According to various embodiments and aspects, whether catalyst systems or processes, the transition metal compound of the catalyst system can be a chromium compound, and the $C_1$ to $C_{18}$ organyl groups at the 2- and 5-positions of the pyrrole compound can be $C_1$ to $C_{18}$ hydrocarbyl groups; or alternatively, the $C_2$ to $C_{18}$ organyl groups at the 2- and 5-positions of the pyrrole compound can be $C_2$ to $C_{18}$ hydrocarbyl groups.

In yet another aspect and in any embodiment of the present disclosure, there is provided an oligomerization process for preparing an oligomerization product, in which this process comprising oligomerizing a feedstock olefin with an oligomerization catalyst system, the catalyst system comprising:
a) a transition metal compound;
b) a pyrrole compound having independently-selected $C_1$ to $C_{18}$ organyl groups at the 2- and 5-positions, wherein at least one of the organyl group alpha-carbon atoms attached to the 2- and 5-positions of the pyrrole compound can be a secondary carbon atom; and
c) a metal alkyl.

Accordingly, in yet another aspect and in any embodiment of the present disclosure, there is provided an oligomerization process for preparing an oligomerization product, in which this process comprising oligomerizing a feedstock olefin with an oligomerization catalyst system, the catalyst system comprising:
a) a transition metal compound;
b) a pyrrole compound having independently-selected $C_2$ to $C_{18}$ organyl groups at the 2- and 5-positions, wherein the organyl group alpha-carbon atoms attached to the 2- and 5-positions of the pyrrole compound can be secondary carbon atoms; and
c) a metal alkyl.

In the various embodiments of this aspect of this disclosure, the transition metal compound of the catalyst system can be a chromium compound, and the $C_1$ to $C_{18}$ organyl groups at the 2- and 5-positions of the pyrrole compound can be $C_1$ to $C_{18}$ hydrocarbyl groups; alternatively, the $C_2$ to $C_{18}$ organyl groups at the 2- and 5-positions of the pyrrole compound can be $C_2$ to $C_{18}$ hydrocarbyl groups.

Various patents and references relate to chromium-based olefin oligomerization systems, including those that provide 1-hexene. Examples of such patents and references include, but are not limited to, U.S. Pat. Nos. 5,376,612, 5,523,507, 5,543,375, 5,689,028, 7,157,612, 6,445,648, 6,380,451, 7,396,970, 7,384,886, 6,133,495, U.S. Patent Application Publication 2002/0182124, U.S. Patent Application Publication 2004/0236163, U.S. Patent Application Publication 2005/0197521, European Patent Application 0608447A1, U.S. Provisional Patent Application No. 61/110,396 (filed Oct. 31, 2008), U.S. Provisional Patent Application No. 61/110,407 (filed Oct. 31, 2008), and U.S. Provisional Patent Application No. 61/110,476 (filed Oct. 31, 2008). All of these patents and patent applications are hereby incorporated by reference in their entireties.

Definitions

To define more clearly the terms used herein, the following definitions are provided. Unless otherwise indicated, the following definitions are applicable to this disclosure. If a term is used in this disclosure but is not specifically defined herein, the definition from the IUPAC Compendium of Chemical Terminology, $2^{nd}$ Ed (1997) can be applied, as long as that definition does not conflict with any other disclosure or definition applied herein, or render indefinite or non-enabled any claim to which that definition is applied. To the extent that any definition or usage provided by any document incorporated herein by reference conflicts with the definition or usage provided herein, the definition or usage provided herein controls.

Regarding claim transitional terms or phrases, the transitional term "comprising", which is synonymous with "including," "containing," or "characterized by," is inclusive or open-ended and does not exclude additional, unrecited elements or method steps. The transitional phrase "consisting of" excludes any element, step, or ingredient not specified in the claim. The transitional phrase "consisting essentially of" limits the scope of a claim to the specified materials or steps and those that do not materially affect the basic and novel characteristic(s) of the claimed invention. A "consisting essentially of" claim occupies a middle ground between closed claims that are written in a "consisting of" format and fully open claims that are drafted in a "comprising" format. Absent an indication to the contrary, when describing a compound or composition "consisting essentially of" is not to be construed as "comprising," but is intended to describe the recited component that includes materials which do not significantly alter composition or method to which the term is applied. For example, a feedstock consisting of a material A can include impurities typically present in a commercially produced or commercially available sample of the recited compound or composition. When a claim 1ncludes different features and/or feature classes (for example, a method step, feedstock features, and/or product features, among other possibilities), the transitional terms comprising, consisting essentially of, and consisting of apply only to feature class to which is utilized and it is possible to have different transitional terms or phrases utilized with different features within a claim. For example a method can comprises several recited steps (and other non-recited steps) but utilize a catalyst system preparation consisting of specific or alternatively consist of specific steps but utilize a catalyst system comprising recited components and other non-recited components.

While compositions and methods are described in terms of "comprising" various components or steps, the compositions and methods can also "consist essentially of" or "consist of" the various components or steps.

The terms "a," "an," and "the" are intended, unless specifically indicated otherwise, to include plural alternatives, e.g., at least one. For instance, the disclosure of "a chromium carboxylate" is meant to encompass chromium carboxylate, or mixtures or combinations of more than one chromium carboxylate unless otherwise specified.

In one aspect, a chemical "group" can be defined or described according to how that group is formally derived from a reference or "parent" compound, for example, by the number of hydrogen atoms that are formally removed from the parent compound to generate the group, even if that group is not literally synthesized in this manner. These groups can be utilized as substituents or coordinated or bonded to metal atoms. By way of example, an "alkyl group" formally can be derived by removing one hydrogen atom from an alkane, while an "alkylene group" formally can be derived by removing two hydrogen atoms from an alkane. Moreover, a more general term can be used to encompass a variety of groups that formally are derived by removing any number ("one or more") hydrogen atoms from a parent compound, which in this example can be described as an "alkane group," and which encompasses an "alkyl group," an "alkylene group," and material have three or more hydrogens atoms, as needed for the situation, removed from and alkane. Throughout, the disclosure that a substituent, ligand, or other chemical moiety may constitute a particular "group" implies that the well-known rules of chemical structure and bonding are followed when that group is employed as described. By way of example, if a subject compound is disclosed in which substituent X can be an "alkyl group," an "alkylene group," or an "alkane group," the normal rules of valence and bonding are followed. When describing a group as being "derived by," "derived from," "formed by," or "formed from," such terms are used in a formal sense and are not intended to reflect any specific synthetic methods or procedure, unless specified otherwise or the context requires otherwise.

Also, unless otherwise specified, any carbon-containing group for which the number of carbon atoms is not specified can have, according to proper chemical practice, 1, 2, 3, 4, 5, 6, 7, 8, 9, 10, 11, 12, 13, 14, 15, 16, 17, 18, 19, 20, 21, 22, 23, 24, 25, 26, 27, 28, 29, or 30 carbon atoms, or any range or combination of ranges between these values. For example, unless otherwise specified, any carbon-containing group can have from 1 to 30 carbon atoms, from 1 to 25 carbon atoms, from 1 to 20 carbon atoms, from 1 to 15 carbon atoms, from 1 to 10 carbon atoms, or from 1 to 5 carbon atoms, and the like. Moreover, other identifiers or qualifying terms may be utilized to indicate the presence or absence of a particular substituent, a particular regiochemistry and/or stereochemistry, or the presence of absence of a branched underlying structure or backbone. Any specific carbon-containing group is limited according to the chemical and structural requirements for that specific group, as understood by one of ordinary skill. For example, unless otherwise specified, an aryl group can have from 6 to 30 carbon atoms, from 6 to 25 carbon atoms, from 6 to 20 carbon atoms, from 6 to 15 carbon atoms, or from 6 to 10 carbon atoms, and the like. Thus, according to proper chemical practice and unless otherwise specified, an aryl group can have, an aryl group can have 6, 7, 8, 9, 10, 11, 12, 13, 14, 15, 16, 17, 18, 19, 20, 21, 22, 23, 24, 25, 26, 27, 28, 29, or 30 carbon atoms, or any range or combination of ranges between these values.

The term "substituted" when used to describe a group, for example, when referring to a substituted analog of a particular group, is intended to describe any non-hydrogen moiety that formally replaces a hydrogen in that group, and is intended to be non-limiting. A group or group may also be referred to herein as "unsubstituted" or by equivalent terms such as "non-substituted," which refers to the original group in which a non-hydrogen moiety does not replace a hydrogen within that group. "Substituted" is intended to be non-limiting and include inorganic substituents or organic substituents as specified and as understood by one of ordinary skill in the art.

A "halide" has its usual meaning; therefore, examples of halides include fluoride, chloride, bromide, and iodide.

The term "hydrocarbon" whenever used in this specification and claims refers to a compound containing only carbon and hydrogen. Other identifiers may be utilized to indicate the presence of particular groups in the hydrocarbon (e.g. halogenated hydrocarbon indicates that the presence of one or more halogen atoms replacing an equivalent number of hydrogen atoms in the hydrocarbon). The term "hydrocarbyl group" is used herein in accordance with the definition specified by IUPAC: a univalent group formed by removing a hydrogen atom from a hydrocarbon (that is, a group containing only carbon and hydrogen). Similarly, a "hydrocarbylene group" refers to a group formed by removing two hydrogen atoms from a hydrocarbon, either two hydrogen atoms from one carbon atom or one hydrogen atom from each of two different carbon atoms. Therefore, in accordance with the terminology used herein, a "hydrocarbon group" refers to a generalized group formed by removing one or more hydrogen atoms (as needed for the particular group) from a hydrocarbon. A "hydrocarbyl group," "hydrocarbylene group," and "hydrocarbon group" can be acyclic or cyclic groups, and/or may be linear or branched. A "hydrocarbyl group," "hydrocarbylene group," and "hydrocarbon group" can include rings, ring systems, aromatic rings, and aromatic ring systems, which contain only carbon and hydrogen. "Hydrocarbyl groups," "hydrocarbylene groups," and "hydrocarbon groups" include, by way of example, aryl, arylene, arene groups, alkyl, alkylene, alkane group, cycloalkyl, cycloalkylene, cycloalkane groups, aralkyl, aralkylene, and aralkane groups, respectively, among other groups as members.

An "aliphatic group" is a generalized group formed by removing one or more hydrogen atoms (as needed for the particular group) from carbon atom of an aliphatic compound. Thus, an aliphatic compound is an acyclic or cyclic, saturated or unsaturated carbon compound, excluding aromatic compounds. That is, an aliphatic compounds is a non-aromatic organic compound. Aliphatic compounds and therefore aliphatic groups may contain organic functional group(s) and/or atom(s) other than carbon and hydrogen.

The term "alkane" whenever used in this specification and claims refers to a saturated hydrocarbon compound. Other identifiers may be utilized to indicate the presence of particular groups in the alkane (e.g. halogenated alkane indicates that the presence of one or more halogen atoms replacing an equivalent number of hydrogen atoms in the alkane). The term "alkyl group" is used herein in accordance with the definition specified by IUPAC: a univalent group formed by removing a hydrogen atom from an alkane. Similarly, an "alkylene group" refers to a group formed by removing two hydrogen atoms from an alkane (either two hydrogen atoms from one carbon atom or one hydrogen atom from two different carbon atoms). An "alkane group" is a general term that refers to a group formed by removing one or more hydrogen atoms (as needed for the particular group) from an alkane. An "alkyl group," "alkylene group," and "alkane group" can be acyclic or cyclic groups, and/or may be linear or branched unless otherwise specified. Primary, secondary, and tertiary alkyl group are derived by removal of a hydrogen atom from a primary, secondary, tertiary carbon atom, respectively, of an alkane. The n-alkyl group derived by removal of a hydrogen atom from a terminal carbon atom of a linear alkane. The groups RCH$_2$ (R≠H), R$_2$CH(R≠H), and R$_3$C(R≠H) are primary, secondary, and tertiary alkyl groups, respectively. The carbon atom which attaches to the indicated moiety are secondary, tertiary, and quaternary carbon atom, respectively.

The term "organyl group" is used herein in accordance with the definition specified by IUPAC: an organic substituent group, regardless of functional type, having one free valence at a carbon atom. Similarly, an "organylene group" refers to an organic group, regardless of functional type, derived by removing two hydrogen atoms from an organic compound, either two hydrogen atoms from one carbon atom or one hydrogen atom from each of two different carbon atoms. An "organic group" refers to a generalized group formed by removing one or more hydrogen atoms from carbon atoms of an organic compound. Thus, an "organyl group," an "organylene group," and an "organic group" can contain organic functional group(s) and/or atom(s) other than carbon and hydrogen, that is, an organic group that can comprise functional groups and/or atoms in addition to carbon and hydrogen. For instance, non-limiting examples of atoms other than carbon and hydrogen include halogens, oxygen, nitrogen, phosphorus, and the like. Non-limiting examples of functional groups include ethers, aldehydes, ketones, esters, sulfides, amines, and phosphines, and so forth. In one aspect, the hydrogen atom(s) removed to form the "organyl group," "organylene group," or "organic group" may be attached to a carbon atom belonging to a functional group, for example, an acyl group (—C(O)R), a formyl group (—C(O)H), a carboxy group (—C(O)OH), a hydrocarboxycarbonyl group (—C(O)OR), a cyano group (—C≡N), a carbamoyl group (—C(O)NH$_2$), a N-hydrocarbylcarbamoyl group (—C(O)NHR), or N,N'-dihydrocarbylcarbamoyl group (—C(O)NR$_2$), among other possibilities. In another aspect, the hydrogen atom(s) removed to form the "organyl group," "organylene group," or "organic group" may be attached to a carbon atom not belonging to, and remote from, a functional group, for example, —CH$_2$C(O)CH$_3$, —CH$_2$NR$_2$, and the like. An "organyl group," "organylene group," or "organic group" may be aliphatic, inclusive of being cyclic or acyclic, or may be aromatic. "Organyl groups," "organylene groups," and "organic groups" also encompass heteroatom-containing rings, heteroatom-containing ring systems, heteroaromatic rings, and heteroaromatic ring systems. "Organyl groups," "organylene groups," and "organic groups" may be linear or branched unless otherwise specified. Finally, it is noted that the "organyl group," "organylene group," or "organic group" definitions include "hydrocarbyl group," "hydrocarbylene group," "hydrocarbon group," respectively, and "alkyl group," "alkylene group," and "alkane group," respectively, among others, as members.

For the purposes of this application, the term or variations of the term "organyl group consisting of inert functional groups" refers to an organyl group wherein the organic functional groups and/or atoms other than carbon and hydrogen present in the functional group are restricted to those functional group and/or atoms other than carbon and hydrogen which are non-reactive under the process conditions defined herein. Thus, the term or variation of the term "organyl groups consisting of inert functional groups" further defines the particular organyl groups that can be present. Additionally, the term "organyl group consisting of inert functional groups" can refer to the presence of one or more inert functional groups within the organyl group. The term or variation of the "organyl group consisting of inert functional group" definition includes the hydrocarbyl group as a member.

For purposes of this application, an "inert functional group" is a group which does not substantially interfere with any process described herein in which it takes part (e.g. interfere with the oligomerization process). Non-limiting examples of inert functional groups which do not substantially interfere with any process described herein can include a halogens (fluoro, chloro, bromo, and iodo), organoxy groups (e.g. hydroxy group or alkoxy group among others), sulfidyl groups, and/or hydrocarbyl groups.

A cycloalkane is a saturated cyclic hydrocarbon, with or without side chains, for example, cyclobutane. Unsaturated cyclic hydrocarbons having one endocyclic double or one triple bond are called cycloalkenes and cycloalkynes, respectively. Those having more than one such multiple bond are cycloalkadienes, cycloalkatrienes, and so forth.

A "cycloalkyl group" is a univalent group derived by removing a hydrogen atom from a ring carbon atom from a cycloalkane. For example, a 1-methylcyclopropyl group and a 2-methylcyclopropyl group are illustrated as follows.

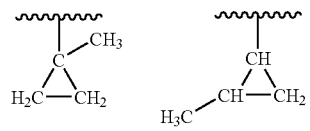

Similarly, a "cycloalkylene group" refers to a group derived by removing two hydrogen atoms from a cycloalkane, at least one of which is a ring carbon. Thus, a "cycloalkylene group" includes both a group derived from a cycloalkane in which two hydrogen atoms are formally removed from the same ring carbon, a group derived from a cycloalkane in which two hydrogen atoms are formally removed from two different ring carbons, and a group derived from a cycloalkane in which a first hydrogen atom is formally removed from a ring carbon and a second hydrogen atom is formally removed from a carbon atom that is not a ring carbon. An "cycloalkane group" refers to a generalized group formed by removing one or more hydrogen atoms (as needed for the particular group and at least one of which is a ring carbon) from a cycloalkane.

The term "alkene" whenever used in this specification and claims refers to an olefin that has at least one carbon-carbon double bond. The term "alkene" includes aliphatic or aromatic, cyclic or acyclic, and/or linear and branched alkene unless expressly stated otherwise. The term "alkene," by itself, does not indicate the presence or absence of heteroatoms and/or the presence or absence of other carbon-carbon double bonds unless explicitly indicated. The terms "hydrocarbon alkene" or "alkene hydrocarbon" refer to olefin compounds containing only hydrogen and carbon. Other identifiers may be utilized to indicate the presence or absence of particular groups within an alkene. Alkenes may also be further identified by the position of the carbon-carbon double bond. Alkenes, having more than one such multiple bond are alkadienes, alkatrienes, and so forth. The alkene may be further identified by the position of the carbon-carbon double bond(s).

An "alkenyl group" is a univalent group derived from an alkene by removal of a hydrogen atom from any carbon atom of the alkene. Thus, "alkenyl group" includes groups in which the hydrogen atom is formally removed from an sp$^2$ hybridized (olefinic) carbon atom and groups in which the hydrogen atom is formally removed from any other carbon atom. For example and unless otherwise specified, propen-1-yl (—CH═CHCH$_3$), propen-2-yl [(CH$_3$)C═CH$_2$], and propen-3-yl (—CH$_2$CH=CH$_2$) groups are all encompassed with the term "alkenyl group." Similarly, an "alkenylene group" refers to a group formed by formally removing two hydrogen atoms from an alkene, either two hydrogen atoms from one carbon atom or one hydrogen atom from two different carbon atoms. An "alkene group" refers to a generalized group formed by removing one or more hydrogen atoms (as needed for the particular group) from an alkene. When the hydrogen atom is removed from a carbon atom participating in a carbon-carbon double bond, the regiochemistry of the carbon from which the hydrogen atom is removed, and regiochemistry of the carbon-carbon double bond may both be specified. The terms "alkenyl group," "alkenylene group," and "alkene group" by themselves do not indicate the presence or absence of heteroatoms and/or the presence or absence of other carbon-carbon double bonds unless explicitly indicated. The terms "hydrocarbon alkenyl group," "hydrocarbon alkenylene group," and "hydrocarbon alkene group" refer to olefin groups containing only hydrogen and carbon. Other identifiers may be utilized to indicated the presence or absence of particular groups within an alkene group. Alkenyl groups may also have more than one such multiple bond. The alkene group may also be further identified by the position of the carbon-carbon double bond(s).

The term "alkyne" is used in this specification and claims to refer to a compound that has at least one carbon-carbon triple bond. The term "alkyne" includes aliphatic or aromatic, cyclic or acyclic, and/or linear and branched alkynes unless expressly stated otherwise. The term "alkyne," by itself, does not indicate the presence or absence of heteroatoms and/or the presence or absence of other carbon-carbon triple bonds unless explicitly indicated. The terms "hydrocarbon alkyne" or "alkyne hydrocarbon" refer to alkyne compounds containing only hydrogen and carbon. Other identifiers may be utilized to indicate the presence or absence of particular groups within an alkyne. Alkynes, having more than one such multiple bond are alkadiynes, alkatriynes, and so forth. The alkyne group may also be further identified by the position of the carbon-carbon triple bond(s).

An "alkynyl group" is a univalent group derived from an alkyne by removal of a hydrogen atom from any carbon atom of the alkyne. Thus, "alkynyl group" includes groups in which the hydrogen atom is formally removed from an sp hybridized (acetylenic) carbon atom and groups in which the hydrogen atom is formally removed from any other carbon atom. For example and unless otherwise specified, 1-propyn-1-yl (—C≡CCH$_3$) and propyn-3-yl (HC≡CCH$_2$—) groups are all encompassed with the term "alkynyl group." Similarly, an "alkynylene group" refers to a group formed by formally removing two hydrogen atoms from an alkyne, either two hydrogen atoms from one carbon atom if possible or one hydrogen atom from two different carbon atoms. An "alkyne group" refers to a generalized group formed by removing one or more hydrogen atoms (as needed for the particular group) from an alkyne. The terms "alkynyl group," "alkynylene group," and "alkyne group" by themselves do not indicate the presence or absence of heteroatoms and/or the presence or absence of other carbon-carbon double bonds unless explicitly indicated. The terms "hydrocarbon alkynyl group," "hydrocarbon alkynylene group," and "hydrocarbon alkyne group" refer to olefin groups containing only hydrogen and carbon. Other identifiers may be utilized to indicate the presence or absence of particular groups within an alkyne group. Alkyne groups may have more than one such multiple bond. Alkyne groups may also be further identified by the position of the carbon-carbon triple bond(s).

The term "alpha olefin" as used in this specification and claims refers to an olefin that has a double bond between the first and second carbon atom of the longest contiguous chain of carbon atoms. The term "alpha olefin" includes linear and branched alpha olefins unless expressly stated otherwise. In the case of branched alpha olefins, a branch may be at the 2-position (a vinylidene) and/or the 3-position or higher with respect to the olefin double bond. The term "vinylidene" whenever used in this specification and claims refers to an alpha olefin having a branch at the 2-position with respect to the olefin double bond. By itself, the term "alpha olefin" does not indicate the presence or absence of heteroatoms and/or the presence or absence of other carbon-carbon double bonds unless explicitly indicated. The terms "hydrocarbon alpha olefin" or "alpha olefin hydrocarbon" refer to alpha olefin compounds containing only hydrogen and carbon.

The term "linear alpha olefin" as used herein refers to a linear olefin having a double bond between the first and second carbon atom. The term "linear alpha olefin" by itself does not indicate the presence or absence of heteroatoms and/or the presence or absence of other carbon-carbon double bonds, unless explicitly indicated. The terms "linear hydrocarbon alpha olefin" or "linear alpha olefin hydrocarbon" refers to linear alpha olefin compounds containing only hydrogen and carbon.

The term "normal alpha olefin" whenever used in this specification and claims refers to a linear hydrocarbon mono-olefin having a double bond between the first and second carbon atom. It is noted that "normal alpha olefin" is not synonymous with "linear alpha olefin" as the term "linear alpha olefin" can include linear olefinic compounds having a double bond between the first and second carbon atoms and having heteroatoms and/or additional double bonds.

An "aromatic group" refers to a generalized group formed by removing one or more hydrogen atoms (as needed for the particular group and at least one of which is an aromatic ring carbon atom) from an aromatic compound. Thus, an "aromatic group" as used herein refers to a group derived by removing one or more hydrogen atoms from an aromatic compound, that is, a compound containing a cyclically conjugated hydrocarbon that follows the Hückel (4n+2) rule and containing (4n+2) pi-electrons, where n is an integer from 1 to about 5. Aromatic compounds and hence "aromatic groups" may be monocyclic or polycyclic unless otherwise specified. Aromatic compounds include "arenes" (hydrocarbon aromatic compounds) and "heteroarenes," also termed "hetarenes" (heteroaromatic compounds formally derived from arenes by replacement of one or more methine (—C=) carbon atoms by trivalent or divalent heteroatoms, in such a way as to maintain the continuous pi-electron system characteristic of aromatic systems and a number of out-of-plane pi-electrons corresponding to the Hückel rule (4n+2). While arene compounds and heteroarene compounds are mutually exclusive members of the group of aromatic compounds, a compound that has both an arene group and a heteroarene group that compound generally is considered a heteroarene compound. Aromatic compounds, arenes, and heteroarenes may be mono- or polycyclic unless otherwise specified. Examples of arenes include, but are not limited to, benzene, naphthalene, and toluene, among others. Examples of heteroarenes include, but are not limited to furan, pyridine, and methylpyridine, among others. As disclosed herein, the term "substituted" may be used to describe an aromatic group wherein any non-hydrogen moiety formally replaces a hydrogen in that group, and is intended to be non-limiting.

An "aryl group" is a group derived from the formal removal of a hydrogen atom from an aromatic hydrocarbon ring carbon atom from an arene compound. One example of an "aryl group" is ortho-tolyl (o-tolyl), the structure of which is shown here.

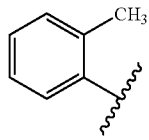 [SMILES: *c1ccccc1C]

Similarly, an "arylene group" refers to a group formed by removing two hydrogen atoms (at least one of which is from an aromatic hydrocarbon ring carbon) from an arene. An "arene group" refers to a generalized group formed by removing one or more hydrogen atoms (as needed for the particular group and at least one of which is an aromatic hydrocarbon ring carbon) from an arene. However, if a group contains separate and distinct arene and heteroarene rings or ring systems (e.g. the phenyl and benzofuran moieties in 7-phenylbenzofuran) its classification depends upon the particular ring or ring system from which the hydrogen atom was removed, that is, an arene group if the removed hydrogen came from the aromatic hydrocarbon ring or ring system carbon atom (e.g. the 2 carbon atom in the phenyl group of 6-phenylbenzofuran and a heteroarene group if the removed hydrogen carbon came from a heteroaromatic ring or ring system carbon atom (e.g. the 2 or 7 carbon atom of the benzofuran group or 6-phenylbenzofuran).

An "aralkyl group" is an aryl-substituted alkyl group having a free valance at a non-aromatic carbon atom, for example, a benzyl group is an "aralkyl" group. Similarly, an "aralkylene group" is an aryl-substituted alkylene group having two free valances at a single non-aromatic carbon atom or a free valence at two non-aromatic carbon atoms while a "aralkane group" is a generalized is an aryl-substituted alkane group having one or more free valances at a non-aromatic carbon atom(s). A "heteroaralkyl group" is a heteroaryl-substituted alkyl group having a free valence at a non-heteroaromatic ring or ring system carbon atom. Similarly a "heteroaralkylene group" is a heteroaryl-substituted alkylene group having a two free valances at a single non-heteroaromatic ring or ring system carbon atom or a free valence at two non-heteroaromatic ring or ring system carbon atoms while a "heteroaralkane group" is a generalized aryl-substituted alkane group having one or more free valances at a non-heteroaromatic ring or ring system carbon atom(s).

If a compound or group contains more than one moiety it is formally a member of the group having the highest naming priority as stipulated by IUPAC. For example 4-phenylpyridine is a heteroaromatic compound and a 4-(phen-2-ylene) pyridin-2-yl group is a heteroaromatic group because the highest naming groups is the pyridine group and the pyridin-2-yl group respectively.

An "organoaluminum compound," is used to describe any compound that contains an aluminum-carbon bond. Thus, organoaluminum compounds include hydrocarbyl aluminum compounds such as trialkyl-, dialkyl-, or monoalkylaluminum compounds; hydrocarbyl alumoxane compounds, and aluminate compounds which contain an aluminum-organyl bond such as tetrakis(p-tolyl)aluminate salts.

The term "reactor effluent," and it derivatives (e.g. oligomerization reactor effluent) generally refers to all the material which exits the reactor. The term "reactor effluent," and its derivatives, may also be prefaced with other descriptors that limit the portion of the reactor effluent being referenced. For example, while the term "reactor effluent" would refer to all material exiting the reactor (e.g. product and solvent or diluent, among others), the term "olefin reactor effluent" refers to the effluent of the reactor which contains an olefin (i.e. carbon-carbon) double bond.

The term "oligomerization," and its derivatives, refers to processes which produce a mixture of products containing at least 70 weight percent products containing from 2 to 30 monomer units. Similarly, an "oligomer" is a product that contains from 2 to 30 monomer units while an "oligomerization product" includes all product made by the "oligomerization" process including the "oligomers" and products which are not "oligomers" (e.g. product which contain more than 30 monomer units. It should be noted that the monomer units in the "oligomer" or "oligomerization product" do not have to be the same. For example, an "oligomer" or "oligomerization product" of an "oligomerization" process using ethylene and propylene as monomers may contain both ethylene and/or propylene units.

The term "trimerization," and it derivatives, refers to a process which produce a mixture of products containing at least 70 weight percent products containing three and only three monomer units. A "trimer" is a product which contains three and only three monomer units while a "trimerization product" includes all products made by the trimerization process including trimer and product which are not trimer (e.g. dimers or tetramers). Generally, an olefin trimerization reduces number of olefinic bonds, i.e., carbon-carbon double bonds, by two when considering the number of olefin bonds in the monmer units and the number of olefin bonds in the trimer. It should be noted that the monomer units in the "trimer" or "trimerization product" do not have be the same. For example, a "trimer" of a "trimerization" process using ethylene and butene as monomers may contain ethylene and/or butene monomer units. That is to say the "trimer" will include $C_6$, $C_8$, $C_{10}$, and $C_{12}$ products. In another example, a "trimer" of a "trimerization" process using ethylene as the monomer may contain ethylene monomer units. It should also be noted that a single molecule may contain two monomer units. For example, dienes such as 1,3-butadiene and 1,4-pentadiene have two monomer units within one molecule.

Oligomerization Catalyst System

The oligomerization catalyst system minimally comprises a transition metal compound, a 2,5-disubstituted pyrrole compound, and a metal alkyl. In one aspect, the pyrrole compound can have independently-selected $C_1$ to $C_{18}$ organyl groups at the 2- and 5-positions, wherein at least one of the organyl group alpha-carbon atoms attached to the 2- and 5-positions of the pyrrole compound can be a secondary carbon atom; alternatively, independently-selected $C_2$ to $C_{18}$ organyl groups at the 2- and 5-positions, wherein the organyl group alpha-carbon atoms attached to the 2- and 5-positions of the pyrrole compound can be secondary carbon atoms. Optionally, the oligomerization catalyst system may further comprise a halogen-containing compound. The transition metal compound, pyrrole compound, metal alkyl, and optional halogen containing compound are independent elements of the oligomerization catalyst system. These elements of the oligomerization catalyst system are independently described herein and independently selected, and these elements may be utilized in any combination to describe the oligomerization catalyst system.

Transition Metal Compound. Generally, the transition metal compound for the oligomerization catalyst system can comprise a group 5, 6, 7, 8, 9, 10, or 11 transition metal. In some embodiments, the transition metal compound comprises chromium, nickel, cobalt, iron, molybdenum, or copper. For example, in some embodiments, the transition metal compound comprises chromium.

In some aspects, the transition metal compound for the oligomerization catalyst system may be an inorganic transition metal compound. In other aspects, the transition metal compound may contain ligands formally derived from an organic compound or moiety (e.g. a carboxylate, alkoxide, or beta-dionate, among others). In an embodiment, suitable inorganic transition metal compounds include, but are not limited to, a transition metal halide, a transition metal sulfate, a transition metal sulfite, a transition metal bisulfate, a transition metal oxide, a transition metal nitrate, a transition metal nitrite, a transition metal hydroxide, a transition metal chlorate, or any combinations thereof; alternatively, transition metal halide, a transition metal sulfate, a transition metal oxide, or a transition metal nitrate. In an embodiment, the transition metal halide may be a transition metal chloride, a transition metal bromide, or a transition metal iodide. In an embodiment, the transition metal compound may be a transition metal alkoxide, a transition metal aryloxide, a transition metal carboxylate, a transition metal beta-dionate (such as an acetylacetonate), a transition metal amide compound; alternatively, a transition metal alkoxide or transition metal aryloxide; alternatively, a transition metal carboxylate, a transition metal beta-dionate; or alternatively, a transition metal amide. Further, in another aspect, suitable transition metal compounds can contain combinations of these recited ligands. In some embodiments the transition metal compound comprises a transition metal carboxylate.

Alternatively and in any aspect and embodiment, suitable transition metal compounds can be a transition metal halide; alternatively, a transition metal sulfate; alternatively, a transition metal sulfite; alternatively, a transition metal bisulfate; alternatively, a transition metal oxide; alternatively, a transition metal nitrate; alternatively, a transition metal nitrite; alternatively, a transition metal hydroxide; alternatively, a transition metal alkoxide; alternatively, a transition metal aryloxide; alternatively, a transition metal carboxylate; alternatively, a transition metal beta-dionate; alternatively, a transition metal chlorate; or alternatively, a transition metal amide. In an embodiment, the transition metal halide may be a transition metal chloride; alternatively, a transition metal bromide; or alternatively, a transition metal iodide.

According to a further aspect of this disclosure and in any embodiment, each transition metal hydrocarboxy group (alkoxy or aryloxy), carboxylate group, beta-dionate group, or amide group may be a $C_1$ to $C_{24}$, a $C_4$ to $C_{19}$, or a $C_5$ to $C_{12}$ hydrocarboxy group (alkoxy or aryloxy), carboxylate group, beta-dionate group, or amide group. In an embodiment, each carboxylate group of the transition metal compound may be a $C_1$ to $C_{24}$ carboxylate group; alternatively, a $C_4$ to $C_{19}$ carboxylate group; or alternatively, a $C_5$ to $C_{12}$ carboxylate group. In some embodiments, each alkoxy group of the transition metal compound may be a $C_1$ to $C_{24}$ alkoxy group; alternatively, a $C_4$ to $C_{19}$ alkoxy group; or alternatively, a $C_5$ to $C_{12}$ alkoxy group. In other embodiments, each aryloxy group of the transition metal compound may be a $C_6$ to $C_{24}$ alkoxy group; alternatively, a $C_6$ to $C_{19}$ alkoxy group; or alternatively, a $C_6$ to $C_{12}$ alkoxy group. In yet other embodiments, each beta-dionate group of the transition metal compound may be a $C_5$ to $C_{24}$ beta-dionate group; alternatively, a $C_5$ to $C_{19}$ beta-dionate group; or alternatively, a $C_5$ to $C_{12}$ beta-dionate group. In further embodiments, amide group of the transition metal compound may be a $C_1$ to $C_{24}$ amide group; alternatively, a $C_3$ to $C_{19}$ amide group; or alternatively, a $C_4$ to $C_{12}$ amide group.

According to a further aspect of this disclosure and in any embodiment, the transition metal compound can have an oxidation state of 0, I, II, III, IV, V, or VI (also written as 0, +1 (or 1), +2 (or 2), +3 (or 3), +4 (or 4), +5 (or 5), or +6 (or 6), respectively. In another aspect and in other embodiments, the transition metal compound can have an oxidation state of II or III; or alternatively, the transition metal compound can have an oxidation state of III. Further to this aspect and in any embodiment, the transition metal compound can have an oxidation state of 0; alternatively, I; alternatively, II; alternatively, III; alternatively, IV; alternatively, V; or alternatively, VI.

In still a further aspect of this disclosure, the transition metal compound for the oligomerization catalyst system can be a chromium compound. In this aspect, the chromium compound can have a chromium oxidation state of 0 to 6. In some embodiments, the chromium compound can may have an oxidation state of 2 or 3 (that is, a chromium(II) or chromium (III) compound). In other embodiments, the chromium compound can have an oxidation state of 3 (i.e. a chromium(III) compound). For example, chromium(II) compounds which may be used as the transition metal compound for the oligomerization catalyst system can include, but are not limited to, chromium(II) nitrate, chromium(II) sulfate, chromium(II) fluoride, chromium(II) chloride, chromium(II) bromide, or chromium(II) iodide. Also by way of example, the chromium (III) compounds which may be used as the transition metal compound for the oligomerization catalyst system can include, but are not limited to, chromium(III) nitrate, chromium(III) sulfate, chromium(III) fluoride, chromium(III) chloride, chromium(III) bromide, or chromium(III) iodide. Alternatively, the chromium compounds that can be used as the transition metal compound for the oligomerization catalyst system can include, but are not limited to, chromium(II) nitrate; alternatively, chromium(II) sulfate; alternatively, chromium(II) fluoride; alternatively, chromium(II) chloride; alternatively, chromium(II) bromide; alternatively, chromium(II) iodide; alternatively, chromium(III) nitrate; alternatively, chromium(III) sulfate; alternatively, chromium(III) fluoride; alternatively, chromium(III) chloride; alternatively, chromium(III) bromide; alternatively, chromium(III) iodide; or alternatively, any combination of any of these compounds.

In yet an additional aspect of this disclosure and in any embodiment, the transition metal compound for the oligomerization catalyst system can be a chromium(II) alkoxide, a chromium(II) carboxylate, a chromium(II) beta-dionate, a chromium(III) alkoxide, a chromium(III) carboxylate, or a chromium(III) beta-dionate; alternatively, a chromium(II) alkoxide or a chromium(III) alkoxide; alternatively, a chromium(II) carboxylate or a chromium(III) carboxylate; alternatively, a chromium(II) beta-dionate or a chromium(III) beta-dionate; alternatively, a chromium(II) alkoxide; alternatively, a chromium(II) carboxylate; alternatively, a chromium (II) beta-dionate; alternatively, a chromium(III) alkoxide; alternatively, a chromium(III) carboxylate; or alternatively, a chromium(III) beta-dionate. In an embodiment, each carboxylate group of the chromium compound may be a $C_1$ to $C_{24}$ carboxylate group; alternatively, a $C_4$ to $C_{19}$ carboxylate group; or alternatively, a $C_5$ to $C_{12}$ carboxylate group. In some embodiments, each alkoxy group of the chromium compound may be a $C_1$ to $C_{24}$ alkoxy group; alternatively, a $C_4$ to $C_{19}$ alkoxy group; or alternatively, a $C_5$ to $C_{12}$ alkoxy group. In other embodiments, each aryloxy group of the chromium compound may be a $C_6$ to $C_{24}$ aryloxy group; alternatively, a $C_6$ to $C_{19}$ aryloxy group; or alternatively, a $C_6$ to $C_{12}$ aryloxy group. In yet other embodiments, each beta-dionate group of the chromium compound may be a $C_5$ to $C_{24}$ beta-dionate group; alternatively, a $C_5$ to $C_{19}$ beta-dionate group; or alternatively, a $C_5$ to $C_{12}$ beta-dionate group. In further embodiments, amide group of the chromium compound may be a $C_1$ to $C_{24}$ amide group; alternatively, a $C_3$ to $C_{19}$ amide group; or alternatively, a $C_4$ to $C_{12}$ amide group.

The chromium carboxylates are particularly useful transition metal compounds for the oligomerization catalyst system. Thus, in one aspect, the catalyst system and process according to this disclosure provides for the use of chromium carboxylate compositions, including but are not limited to, chromium carboxylate compositions in which the carboxylate is a $C_1$ to $C_{24}$ monocarboxylate. The most widely employed chromium carboxylate composition catalysts are those of chromium(III), for example, chromium(III) compositions comprising 2-ethylhexanoate are effective catalyst system components for selective 1-hexene synthesis.

In one aspect, this disclosure provides chromium carboxylate composition in which the carboxylate group is a $C_1$ to $C_{24}$ monocarboxylate. In an embodiment, the carboxylate group may be an acetate, a propionate, a butyrate, a pentanoate, a hexanoate, a heptanoate, an octanoate, a nonanoate, a decanoate, an undecanoate, a dodecanoate, a tridecanoate, a tetradecanoate, a pentadecanoate, a hexadecanoate, a heptadecanoate, or an octadecanoate; or alternatively, a pentanoate, a hexanoate, a heptanoate, a octanoate, a nonanoate, a decanoate, a undecanoate, or a dodecanoate. In some embodiments, the carboxylate group may be acetate, propionate, n-butyrate, valerate (n-pentanoate), neo-pentanoate, capronate (n-hexanoate), n-heptanoate, caprylate (n-octanoate), 2-ethylhexanoate, n-nonanoate, caprate (n-decanoate), n-undecanoate, laurate (n-dodecanoate), or stearate (n-octadecanoate); alternatively, valerate (n-pentanoate), neo-pentanoate, capronate (n-hexanoate), n-heptanoate, caprylate (n-octanoate), 2-ethylhexanoate, n-nonanoate, caprate (n-decanoate), n-undecanoate, or laurate (n-dodecanoate); alternatively, capronate (n-hexanoate); alternatively, n-heptanoate); alternatively, caprylate (n-octanoate); or alternatively, 2-ethylhexanoate.

In an aspect and in any embodiment, the transition metal compound for the oligomerization catalyst system may be a chromium(II) carboxylate; or alternatively, a chromium(III) carboxylate. Exemplary chromium(II) carboxylates may include, but are not limited to, chromium(II) acetate, chromium(II) propionate, chromium(II) butyrate, chromium(II) neopentanoate, chromium(II) oxalate, chromium(II) octanoate, chromium(II) (2-ethylhexanoate), chromium(II) laurate, or chromium(II) stearate. Exemplary chromium(III) carboxylates may include, but are not limited to, chromium (III) acetate, chromium(III) propionate, chromium(III) butyrate, chromium(III) neopentanoate, chromium(III) oxalate, chromium(III) octanoate, chromium(III) 2-ethylhexanoate, chromium(III) 2,2,6,6,-tetramethylheptanedionate, chromium(III) naphthenate, chromium(III) laurate, or chromium(III) stearate. In a further aspect and in any number of embodiments, the transition metal compound for the oligomerization catalyst system may be, but are not limited to: chromium(II) acetate; alternatively, chromium(II) propionate; alternatively, chromium(II) butyrate; alternatively, chromium(II) neopentanoate; alternatively, chromium(II) oxalate; alternatively, chromium(II) octanoate; alternatively, chromium(II) (2-ethylhexanoate); alternatively, chromium (II) laurate; alternatively, chromium(II) stearate; alternatively, chromium(III) acetate; alternatively, chromium(III) propionate; alternatively, chromium(III) butyrate; alternatively, chromium(III) neopentanoate; alternatively, chromium(III) oxalate; alternatively, chromium(III) octanoate; alternatively, chromium(III) 2-ethylhexanoate; alternatively, chromium(III) 2,2,6,6,-tetramethylheptane dionate; alternatively, chromium(III) naphthenate; alternatively, chromium (III) laurate; or alternatively, chromium(III) stearate. In some embodiments, the transition metal compound for the oligomerization catalyst system can be chromium(II) 2-ethylhexanoate or chromium(III) 2-ethylhexanote; or alternatively chromium(III) 2-ethylhexanoate.

Pyrrole Compound. Generally, the pyrrole compound (also called the "pyrrole") of the oligomerization catalyst system can comprise or can consist essentially of, a pyrrole compound having a $C_1$ to $C_{18}$ group attached to the 2- and 5-positions of the pyrrole. Unless otherwise specified, the pyrrole compound having a $C_1$ to $C_{18}$ group attached to the 2- and 5-positions, may have groups attached at the 1, 3, and/or 4 positions. In an embodiment, the pyrrole compound of the oligomerization catalyst system can be a 2,5-disubstituted pyrrole compound, that is, the pyrrole compound has substituents only at the 2- and 5-positions. Regardless of whether or not the pyrrole compound has substituents present at the 1, 3, and/or 4 positions, the groups attached to the 2- and 5-positions of the pyrrole compound may be the same or different. For example, 2-ethyl-5-methylpyrrole and 2-ethyl-5-propyl pyrrole are among the suitable 2,5-disubstituted pyrroles for use in the catalyst system and methods of this disclosure. In other aspects and embodiments, the groups attached to the 2- and 5-positions of the pyrrole compound may be the same.

The $C_1$ to $C_{18}$ groups attached to the 2- and 5-positions of the pyrrole ring may be $C_1$ to $C_{18}$ organyl groups in which the organyl groups may be $C_1$ to $C_{18}$ organyl groups containing inert functional groups, $C_1$ to $C_{18}$ hydrocarbyl groups; or alternatively $C_1$ to $C_{18}$ alkyl groups. Alternatively, the groups attached to the 2- and 5-positions of the pyrrole ring may be $C_1$ to $C_{12}$ organyl groups, $C_1$ to $C_{12}$ organyl groups containing inert functional groups, $C_1$ to $C_{12}$ hydrocarbyl groups; or alternatively, $C_1$ to $C_12$ alkyl groups. Alternatively, the groups attached to the 2- and 5-positions of the pyrrole ring may be $C_1$ to $C_8$ organyl groups, $C_1$ to $C_8$ organyl groups containing inert functional groups, $C_1$ to $C_9$ hydrocarbyl groups; or alternatively, $C_1$ to $C_8$ alkyl groups. According to any embodiment of this disclosure, the pyrrole compound can have independently-selected organyl groups ($C_1$ to $C_{18}$, alternatively $C_1$ to $C_{12}$, or alternatively $C_1$ to $C_8$) at the 2- and 5-positions. Alternatively, the pyrrole compound can have independently-selected organyl groups consisting of inert functional group ($C_1$ to $C_{18}$, alternatively $C_1$ to $C_{12}$, or alternatively $C_1$ to $C_8$) at the 2- and 5-positions. Alternatively still, the pyrrole compound can have independently-selected hydrocarbyl groups ($C_1$ to $C_{18}$, alternatively $C_1$ to $C_{12}$, or alternatively $C_1$ to $C_8$) at the 2- and 5-positions. Yet alternatively, the pyrrole compound can have independently-selected alkyl groups ($C_1$ to $C_{18}$, alternatively $C_1$ to $C_{12}$, or alternatively $C_1$ to $C_8$) at the 2- and 5-positions.

The $C_2$ to $C_{18}$ groups attached to the 2- and 5-positions of the pyrrole ring may be $C_2$ to $C_{18}$ organyl groups in which the organyl groups may be $C_2$ to $C_{18}$ organyl groups containing inert functional groups, $C_2$ to $C_{18}$ hydrocarbyl groups; or alternatively $C_2$ to $C_{18}$ alkyl groups. Alternatively, the groups attached to the 2- and 5-positions of the pyrrole ring may be $C_2$ to $C_{12}$ organyl groups, $C_2$ to $C_{12}$ organyl groups containing inert functional groups, $C_2$ to $C_{12}$ hydrocarbyl groups; or alternatively, $C_2$ to $C_{12}$ alkyl groups. Alternatively, the groups attached to the 2- and 5-positions of the pyrrole ring may be $C_2$ to $C_8$ organyl groups, $C_2$ to $C_8$ organyl groups containing inert functional groups, $C_2$ to $C_8$ hydrocarbyl groups; or alternatively, $C_2$ to $C_8$ alkyl groups. According to any embodiment of this disclosure, the pyrrole compound can have independently-selected organyl groups ($C_2$ to $C_{18}$, alternatively $C_2$ to $C_{12}$, or alternatively $C_2$ to $C_8$) at the 2- and 5-positions.

Alternatively, the pyrrole compound can have independently-selected organyl groups consisting of inert functional group ($C_2$ to $C_{18}$, alternatively $C_2$ to $C_{12}$, or alternatively $C_2$ to $C_8$) at the 2- and 5-positions. Alternatively still, the pyrrole compound can have independently-selected hydrocarbyl groups ($C_2$ to $C_{18}$, alternatively $C_2$ to $C_{12}$, or alternatively $C_2$ to $C_8$) at the 2- and 5-positions. Yet alternatively, the pyrrole compound can have independently-selected alkyl groups ($C_2$ to $C_{18}$, alternatively $C_2$ to $C_{12}$, or alternatively $C_2$ to $C_8$) at the 2- and 5-positions.

Generally, the groups attached to the 2- and 5-positions of the pyrrole ring are attached to the pyrrole ring in such a way that at least one carbon atom attached to the 2- and 5-positions of the pyrrole ring is a secondary carbon atom; alternatively, the groups attached to the 2- and 5-positions of the pyrrole ring are attached to the pyrrole ring in such a way that both the carbon atoms attached to the 2- and 5-positions of the pyrrole ring are secondary carbon atoms. That is, when the carbon atom of the group attached to the pyrrole ring is a secondary carbon atom, that secondary carbon is attached to one, and only one, other carbon atom besides the carbon atom of the pyrrole ring. In some embodiments, the groups attached to the 2- and 5-positions are attached in such a way that the carbon atom attached to the 2- and 5-positions of the pyrrole ring are secondary carbon atoms, and the groups are branched. In other embodiments the groups attached to the 2 and 5 position of the pyrrole ring may be linear.

In an aspect, the pyrrole compound is a pyrrole compound having $C_1$ to $C_{18}$, alternatively $C_1$ to $C_{12}$, or alternatively $C_1$ to $C_8$, n-alkyl groups attached at the 2- and 5-positions of the pyrrole ring. In another aspect and embodiment, the pyrrole compound is a pyrrole compound having $C_2$ to $C_{18}$, alternatively $C_2$ to $C_{12}$, or alternatively $C_2$ to $C_8$, n-alkyl groups attached at the 2- and 5-positions of the pyrrole ring. In further embodiments, the n-alkyl groups are selected independently from methyl, ethyl, n-propyl, n-butyl, n-pentyl, n-hexyl, n-heptyl, or n-octyl; alternatively, ethyl, n-propyl, n-butyl, n-pentyl, n-hexyl, n-heptyl, or n-octyl; alternatively, ethyl, n-propyl, n-butyl, or n-pentyl; alternatively, ethyl; alternatively, n-propyl; alternatively, n-butyl; alternatively, n-pentyl; alternatively, n-hexyl; alternatively, n-heptyl; or alternatively, n-octyl. In another embodiment, the pyrrole compound is 2,5-diethyl pyrrole; alternatively, 2,5-di-n-propyl pyrrole; alternatively, 2,5-di-n-butyl pyrrole; alternatively, 2,5-di-n-pentyl pyrrole; or alternatively, 2,5-di-n-hexyl pyrrole. According to this aspect, the pyrrole compound has alkyl groups at the 2- and 5-positions selected independently from ethyl, n-propyl, n-butyl, n-pentyl, n-hexyl, n-heptyl, or n-octyl; alternatively, ethyl, n-propyl, n-butyl, or n-pentyl; alternatively, ethyl; alternatively, n-propyl; alternatively, n-butyl; alternatively, n-pentyl; alternatively, n-hexyl; alternatively, n-heptyl; or alternatively, n-octyl. For example, the pyrrole compound of the catalyst system can be a 2,5-disubstituted pyrrole, such as 2,5-diethyl pyrrole.

In yet a further aspect of this disclosure, the pyrrole can have the formula P1:

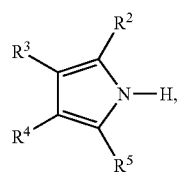

(P1)

wherein a) $R^2$ and $R^5$ are selected independently from a $C_1$ to $C_{18}$ organyl group, wherein at least one of the organyl group alpha-carbon atoms attached to the pyrrole ring is a secondary carbon atom; and b) $R^3$ and $R^4$ are selected independently from hydrogen and a $C_1$ to $C_{18}$ organyl group.

In an embodiment, the pyrrole can have the formula P1, wherein a) $R^2$ and $R^5$ are selected independently from a $C_2$ to $C_{18}$ organyl group, wherein the organyl group alpha-carbon atoms attached to the pyrrole ring are secondary carbon atoms; and b) $R^3$ and $R^4$ are selected independently from hydrogen and a $C_1$ to $C_{18}$ organyl group.

In this aspect, $R^2$, $R^3$, $R^4$, and $R^5$ are independent elements of the pyrrole having formula P1. The pyrrole having formula P1 may be described using any combination of the $R^2$, $R^3$, $R^4$, and $R^5$ described herein. In an embodiment, $R^2$ and $R^5$ are selected independently from a $C_1$ to $C_{18}$ organyl groups, wherein at least one organyl group alpha-carbon atoms attached to the pyrrole ring is a secondary carbon atom and $R^3$ and $R^4$ are hydrogen. In another embodiment, $R^2$ and $R^5$ are selected independently from a $C_2$ to $C_{18}$ organyl groups, wherein the organyl group alpha-carbon atoms attached to the pyrrole ring are secondary carbon atoms and $R^3$ and $R^4$ are hydrogen. In some embodiments, $R^2$ and $R^5$ are selected independently from a $C_1$ to $C_{18}$ organyl groups, wherein at least one of the organyl group alpha-carbon atoms attached to the pyrrole ring is a secondary carbon atom, and $R^3$ is hydrogen and $R^4$ is a $C_1$ to $C_{18}$ organyl group. In some other embodiments, $R^2$ and $R^5$ are selected independently from a $C_2$ to $C_{18}$ organyl groups, wherein the organyl group alpha-carbon atoms attached to the pyrrole ring are secondary carbon atoms, and $R^3$ is hydrogen and $R^4$ is a $C_1$ to $C_{18}$ organyl group. In other embodiments, $R^2$ and $R^5$ are selected independently from a $C_1$ to $C_{18}$ organyl groups, wherein at least one of the organyl group alpha-carbon atoms attached to the pyrrole ring is a secondary carbon atom and $R^3$ and $R^4$ are selected independently from a $C_1$ to $C_{18}$ organyl groups. In yet other embodiments, $R^2$ and $R^5$ are selected independently from a $C_2$ to $C_{18}$ organyl groups, wherein the organyl group alpha-carbon atoms attached to the pyrrole ring are secondary carbon atoms and $R^3$ and $R^4$ are selected independently from a $C_1$ to $C_{18}$ organyl groups.

In an aspect, the $R^2$ group and/or $R^5$ which is a $C_1$ to $C_{18}$ organyl group, wherein the at least one organyl group alpha-carbon atoms attached to the pyrrole ring is a secondary carbon atom may be a $C_1$ to $C_{12}$ organyl group; alternatively, a $C_1$ to $C_8$ organyl group; alternatively, a $C_1$ to $C_{18}$ organyl group containing inert functional groups; a $C_1$ to $C_{12}$ organyl group containing inert functional groups; alternatively, a $C_1$ to $C_8$ organyl group containing inert functional groups; alternatively, a $C_1$ to $C_{18}$ hydrocarbyl group; a $C_1$ to $C_{12}$ hydrocarbyl group; alternatively, a $C_1$ to $C_8$ hydrocarbyl group; alternatively, $C_1$ to $C_{18}$ alkyl group; alternatively, a $C_1$ to $C_{12}$ alkyl group; or alternatively, a $C_1$ to $C_8$ alkyl group.

In an embodiment, the $R^2$ group which is a $C_2$ to $C_{18}$ organyl group, wherein the organyl group alpha-carbon atoms attached to the pyrrole ring are secondary carbon atoms may be a $C_2$ to $C_{12}$ organyl group; alternatively, a $C_2$ to $C_8$ organyl group; alternatively, a $C_2$ to $C_{18}$ organyl group containing inert functional groups; a $C_2$ to $C_{12}$ organyl group containing inert functional groups; alternatively, a $C_2$ to $C_8$ organyl group containing inert functional groups; alternatively, a $C_2$ to $C_{18}$ hydrocarbyl group; a $C_2$ to $C_{12}$ hydrocarbyl group; alternatively, a $C_2$ to $C_8$ hydrocarbyl group; alternatively, $C_2$ to $C_{18}$ alkyl group; alternatively, a $C_2$ to $C_{12}$ alkyl group; or alternatively, a $C_2$ to $C_8$ alkyl group. In an embodiment, the $R^5$ group which is a $C_2$ to $C_{18}$ organyl group, wherein the organyl group alpha-carbon atoms attached to the pyrrole ring are secondary carbon atoms may be a $C_2$ to $C_{12}$ organyl group; alternatively, a $C_2$ to $C_8$ organyl group; alternatively, a $C_2$ to $C_{18}$ organyl group containing inert functional groups; a $C_2$ to $C_{12}$ organyl group containing inert functional groups; alternatively, a $C_2$ to $C_8$ organyl group containing inert functional groups; alternatively, a $C_2$ to $C_{18}$ hydrocarbyl group; a $C_2$ to $C_{12}$ hydrocarbyl group; alternatively, a $C_2$ to $C_8$ hydrocarbyl group; alternatively, $C_2$ to $C_{18}$ alkyl group; alternatively, a $C_2$ to $C_{12}$ alkyl group; or alternatively, a $C_2$ to $C_8$ alkyl group. In an aspect, $R^3$ may be hydrogen or a $C_1$ to $C_{12}$ organyl group; alternatively, hydrogen or a $C_1$ to $C_8$ organyl group; alternatively, hydrogen or a $C_1$ to $C_{18}$ organyl group containing inert functional groups; hydrogen or a $C_1$ to $C_{12}$ organyl group containing inert functional groups; alternatively, hydrogen or a $C_1$ to $C_8$ organyl group containing inert functional groups; alternatively, hydrogen or a $C_1$ to $C_{18}$ hydrocarbyl group; hydrogen or a $C_1$ to $C_{12}$ hydrocarbyl group; alternatively, hydrogen or a $C_1$ to $C_8$ hydrocarbyl group; alternatively, hydrogen or a $C_1$ to $C_{18}$ alkyl group; alternatively, hydrogen or a $C_1$ to $C_{12}$ alkyl group; or alternatively, hydrogen or a $C_1$ to $C_8$ alkyl group. In an embodiment, $R^3$ may be a $C_1$ to $C_{12}$ organyl group; alternatively, a $C_1$ to $C_8$ organyl group; alternatively, a $C_1$ to $C_{18}$ organyl group containing inert functional groups; a $C_1$ to $C_{12}$ organyl group containing inert functional groups; alternatively, a $C_1$ to $C_8$ organyl group containing inert functional groups; alternatively, a $C_1$ to $C_{18}$ hydrocarbyl group; a $C_1$ to $C_{12}$ hydrocarbyl group; alternatively, a $C_1$ to $C_8$ hydrocarbyl group; alternatively, $C_1$ to $C_{18}$ alkyl group; alternatively, a $C_1$ to $C_{12}$ alkyl group; or alternatively, a $C_1$ to $C_8$ alkyl group; or alternatively, hydrogen. In an aspect, $R^4$ may be hydrogen or a $C_1$ to $C_{12}$ organyl group; alternatively, hydrogen or a $C_1$ to $C_8$ organyl group; alternatively, hydrogen or a $C_1$ to $C_{18}$ organyl group containing inert functional groups; hydrogen or a $C_1$ to $C_{12}$ organyl group containing inert functional groups; alternatively, hydrogen or a $C_1$ to $C_8$ organyl group containing inert functional groups; alternatively, hydrogen or a $C_1$ to $C_{18}$ hydrocarbyl group; hydrogen or a $C_1$ to $C_{12}$ hydrocarbyl group; alternatively, hydrogen or a $C_1$ to $C_8$ hydrocarbyl group; alternatively, hydrogen or a $C_1$ to $C_{18}$ alkyl group; alternatively, hydrogen or a $C_1$ to $C_{12}$ alkyl group; or alternatively, hydrogen or a $C_1$ to $C_8$ alkyl group. In an embodiment, $R^4$ may be a $C_1$ to $C_{12}$ organyl group; alternatively, a $C_1$ to $C_8$ organyl group; alternatively, a $C_1$ to $C_{18}$ organyl group containing inert functional groups; a $C_1$ to $C_{12}$ organyl group containing inert functional groups; alternatively, a $C_1$ to $C_8$ organyl group containing inert functional groups; alternatively, a $C_1$ to $C_{18}$ hydrocarbyl group; a $C_1$ to $C_{12}$ hydrocarbyl group; alternatively, a $C_1$ to $C_8$ hydrocarbyl group; alternatively, $C_1$ to $C_{18}$ alkyl group; alternatively, a $C_1$ to $C_{12}$ alkyl group; alternatively, a $C_1$ to $C_8$ alkyl group; or alternatively, hydrogen.

In any aspect of the pyrrole of the formula P1, each of $R^2$ and $R^5$ can be selected independently from a methyl group, an ethyl group, an n-propyl group, an n-butyl group, an n-pentyl group, an n-hexyl group, an n-heptyl group, or an n-octyl group; alternatively, an ethyl group, an n-propyl group, an n-butyl group, an n-pentyl group, an n-hexyl group, an n-heptyl group, or an n-octyl group. In some embodiments, of the pyrrole of the formula P1, $R^2$ and $R^5$ can be selected independently from a methyl group, an ethyl group, an n-propyl group, an n-butyl group, or an n-pentyl group; alternatively, an ethyl group, an n-propyl group, an n-butyl group, or an n-pentyl group; alternatively, a methyl group; alternatively, an ethyl group; alternatively, an n-propyl group; alternatively, an n-butyl group; alternatively, an n-pentyl group; alternatively, an n-hexyl group; alternatively, an n-heptyl group; or alternatively, an n-octyl group.

In any aspect of any pyrrole having the formula P1, $R^3$ and/or $R^4$ when not hydrogen can be a methyl group, an ethyl group, a propyl group, a butyl group, a pentyl group, a hexyl group, a heptyl group, or an octyl group; alternatively, a methyl group, an ethyl group, a propyl group, a butyl group, or a pentyl group; alternatively, a methyl group; alternatively, an ethyl group; alternatively, a propyl group; alternatively, a butyl group; alternatively, a pentyl group; alternatively, a hexyl group; alternatively, a heptyl group; or alternatively, an octyl group. In an embodiment of any pyrrole having the formula P1, $R^3$ and/or $R^4$ when not hydrogen can be a methyl group, an ethyl group, an n-propyl group, an iso-propyl group, an n-butyl group, a sec-butyl group, an iso-butyl group, a tert-butyl group, an n-pentyl group, a neo-pentyl group, an n-hexyl group, an n-heptyl group, or an n-octyl group; alternatively, a methyl group, an ethyl group, an n-propyl group, an iso-propyl group, an n-butyl group, a sec-butyl group, an iso-butyl group, a tert-butyl group, an n-pentyl group, or a neo-pentyl group; alternatively, an n-propyl group; alternatively, an iso-propyl group; alternatively, an n-butyl group; alternatively, a sec-butyl group; alternatively, an iso-butyl group; alternatively, a tert-butyl group; alternatively, an n-pentyl group; alternatively, a neo-pentyl group; alternatively, an n-hexyl group; alternatively, an n-heptyl group; or alternatively, an n-octyl group.

According to a further aspect, the pyrrole of the catalyst system disclosed here can be selected from a 2,5-dialkylpyrrole, a 2,3,5-triialkylpyrrole, a 2,4,5-triialkylpyrrole, a 2,3,4,5-tetraalkylpyrrole, or any combination thereof. In this aspect, and not by way of limitation, the pyrrole can be selected from 2-methyl-5-ethylpyrrole, 2,5-diethylpyrrrole, 2,5-dipropylpyrrole, 2,5-dibutylpyrrole, 2,5-hexylpyrrole, 2,5-diheptylpyrrole, 2,5-dioctylpyrrole, 2,3,5-trimethylpyrrole, 2,3,5-triethylpyrrrole, 2,3,5-tributylpyrrrole, 2,3,5-trihexylpyrrrole, 2,3,5-triheptylpyrrrole, 2,3,5-trioctylpyrrrole, 2,3,4,5-tetramethylpyrrole, 2,3,4,5-tetraethylpyrrole, 2,3,4,5-tetrabutylpyrrole, 2,3,4,5-tetrahexylpyrrole, 2,5-bis(2',2',2'-trifluoroethyl)pyrrole, 2,5-bis(2'-methoxymethyl)pyrrole, or any combination thereof. In some embodiments, the pyrrole may be 2-methyl-5-ethylpyrrole; alternatively, 2,5-diethylpyrrrole; alternatively, 2,5-di-n-propylpyrrole; alternatively, 2,5-di-n-butylpyrrole; alternatively, 2,5-n-hexylpyrrole; alternatively, 2,5-di-n-heptylpyrrole; or alternatively, 2,5-di-n-octylpyrrole.

Metal Alkyl. Generally, and according to one aspect of this disclosure, the metal alkyl may be any heteroleptic or homoleptic metal alkyl compound. For example, the metal of the metal alkyl can comprise or can be a group 1, 2, 11, 12, 13, or 14 metal; or alternatively, a group 13 or 14 metal; or alternatively, a group 13 metal. In some embodiments and aspects, the metal alkyl may comprise a lithium alkyl, sodium alkyl, magnesium alkyl, boron alkyl, a zinc alkyl, or an aluminum alkyl. In this aspect, for example, suitable metal alkyls include, but are not limited to, n-butyl lithium, sec-butyl lithium, tert-butyl lithium, diethyl magnesium, or diethyl zinc. In an embodiment the metal alkyl may be an aluminum alkyl.

According to a further aspect and in any embodiment of this disclosure, the metal alkyl may be a metal alkyl halide. Metal alkyl halides are described herein and may be utilized as the metal alkyl component of the oligomerization catalyst system. The halide portion of the metal alkyl halide maybe chloride; alternatively bromide; or alternatively iodide.

In some aspects and embodiments according to this disclosure, the metal alkyl can be a non-hydrolyzed alkyl aluminum compound. In an embodiment, the non-hydrolyzed alkyl aluminum compound may be a trialkyl aluminum compound, an alkyl aluminum halide, or and alkyl aluminum alkoxide. Generally, each alkyl group of any metal alkyl described herein (e.g. alkyl aluminum compound or alkylaluminum halide, among others), if there is more than one, may independently be a $C_1$ to $C_{20}$ alkyl group; alternatively, a $C_1$ to $C_{10}$ alkyl group; or alternatively, a $C_1$ to $C_6$ alkyl group. In an embodiment the alkyl group(s) may independently be a methyl group, an ethyl group, a propyl group, a butyl group, a pentyl group, a hexyl group, a heptyl group, or an octyl group; alternatively, a methyl group, a ethyl group, a butyl group, a hexyl group, or an octyl group. In some embodiments, the alkyl group may independently be a methyl group, an ethyl group, an n-propyl group, an n-butyl group, an iso-butyl group, a n-hexyl group, or an n-octyl group; alternatively, a methyl group, an ethyl group, a n-butyl group, or an iso-butyl group; alternatively, a methyl group; alternatively, an ethyl group; alternatively, an n-propyl group; alternatively, an n-butyl group; alternatively, an iso-butyl group; alternatively, a n-hexyl group; or alternatively, an n-octyl group.

According to another aspect of this disclosure, the metal alkyl can comprise or can be selected from a trialkyl aluminum compound, a dialkyl aluminum halide compound, an alkyl aluminum dihalide compound, a dialkyl aluminum hydride compound, an alkyl aluminum dihydride compound, a dialkyl aluminum hydrocarbyloxide compound, an alkyl aluminum dihydrocarbyloxide compound, an alkyl aluminum sesquihalide compound, an alkyl aluminum sesquihydrocarbyloxide compound, or any combination thereof. Applicable alkyl groups and halides for the metal alkyl, metal alkyl halides, and/or metal alkyl hydrocarbyloxides are described herein and may be utilized to further describe the suitable metal alkyls.

Exemplary trialkyl aluminum compounds may include but are not limited to, trimethyl aluminum (TMA), triethyl aluminum (TEA), tripropyl aluminum, tri-n-butyl aluminum, or tri-isobutyl aluminum, or mixtures thereof. Exemplary alkyl aluminum halide compounds may include, but are not limited to, diethylaluminum chloride (DEAC), diethylaluminum bromide, ethylaluminum dichloride, ethylaluminum sesquichloride, and mixtures thereof. In various embodiments, the trialkyl aluminum compound may be triethyl aluminum.

According to a further aspect, the metal alkyl compound may be a mixture of a trialkyl aluminum compound and an alkyl aluminum halide. Generally, the trialkyl aluminum compound of the mixture may be any trialkyl aluminum compound described herein. The alkyl aluminum halide compound of the mixture may be any alkyl aluminum compound described herein. In some embodiments, the mixture of the trialkyl aluminum compound and the alkyl aluminum halide may comprise, or consist essentially of, triethyl aluminum and diethyl aluminum chloride, triethyl aluminum and ethyl aluminum dichloride, or triethyl aluminum and ethyl aluminum sesquichloride. In an embodiment, the metal alkyl component of the oligomerization catalyst system may be a mixture of triethyl aluminum and diethyl aluminum chloride.

In another aspect and in any embodiments, specific examples of metal alkyls that are useful in this disclosure can comprise or can include, but are not limited to trimethylaluminum (TMA), triethylaluminum (TEA), ethylaluminum dichloride, tripropylaluminum, diethylaluminum ethoxide, tributylaluminum, disobutylaluminum hydride, triisobutylaluminum, diethylaluminum chloride (DEAC), and combinations thereof. In other aspects, and in any embodiments, specific examples of metal alkyls that are useful in this disclosure can comprise or can include, but are not limited to triethylaluminum (TEA) or diethylaluminum chloride (DEAC).

Halogen-Containing Compound. While not intending to be bound by theory, it is thought that a halogen-containing compound can improve the product purity and selectivity of the oligomerization process. In some aspects and embodiments, the halogen-containing compound may be a chloride-containing compound, a bromide-containing compound, or an iodide-containing compound. In an embodiment, the halogen-containing compound may be a chloride-containing compound.

In an aspect, the halogen-containing compound, regardless of whether it is a chloride-, bromide-, or iodide-containing compound, may be a metal halide, alkyl metal halide, or an organic halide. In various embodiments and aspect, the halogen-containing compound may be a metal chloride; alternatively, a metal bromide; or alternatively, a metal iodide. In an embodiment, the halogen-containing compound may be a metal alkyl chloride; alternatively, a metal alkyl bromide; or alternatively, a metal iodide. In an embodiment, the halogen-containing compound may be an organic chloride; alternatively, an organic bromide; or alternatively, an organic iodide.

Moreover, and in another aspect, the halogen-containing compound comprises a group 3 metal halide, a group 4 metal halide, a group 5 metal halide, a group 13 metal halide, a group 14 metal halide, a group 15 metal halide, or any combination thereof. By way of example, the halogen-containing compound can be or the halogen-containing compound can comprise scandium chloride, yttrium chloride, lanthanum chloride, titanium tetrachloride, zirconium tetrachloride, hafnium tetrachloride, boron trichloride, aluminum chloride, gallium chloride, silicon tetrachloride, trimethyl chlorosilane, germanium tetrachloride, tin tetrachloride, phosphorus trichloride, antimony trichloride, antimony pentachloride, bismuth trichloride, boron tribromide, aluminum tribromide, silicon tetrachloride, silicon tetrabromide, aluminum fluoride, molybdenum pentachloride, tungsten hexachloride, trityl hexachloroantimonate, or any combination thereof.

In accordance with another aspect, the halogen-containing compound can be or the halogen-containing compound can comprise, a Group 1, 2, 12, or 13 alkyl metal halide; alternatively, a Group 12 or 13 alkyl metal halide; or alternatively, an alkyl aluminum halide or an alkyl tin halide. According to a further aspect, the halogen-containing compound can be or the halogen-containing compound can comprise, an alkyl aluminum halide. In some embodiment, the alkyl aluminum halide may be an alkyl aluminum chloride; alternatively, an alkyl aluminum bromide; or alternatively, and alkyl aluminum iodide. In other embodiments, the alkyl tin halide may be an alkyl tin chloride; alternatively, an alkyl tin bromide; or alternatively, an alkyl tin iodide. In an embodiment, the alkyl metal halide may be an alkyl aluminum halide. In another embodiment, the alkyl metal halide may be an alkyl tin halide.

In various embodiments and according to another aspect, the halogen-containing compound can comprise or can be selected from a dialkylaluminum halide, an alkylaluminum dihalide, or an alkylaluminum sesquihalide. In this aspect, the alkyl group of the alkyl aluminum halide, the alkyl tin halide, the dialkylaluminum halide, the alkylaluminum dihalide, or the alkylaluminum sesquihalide is a $C_1$ to $C_8$ alkyl group. Moreover and in this aspect, the halogen-containing compound can comprise diethylaluminum chloride, ethyl aluminum sesquichloride, ethyl aluminum dichloride, tributyl tin chloride, dibutyl tin dichloride, or any combination thereof; alternatively, diethylaluminum chloride, ethyl aluminum sesquichloride, ethyl aluminum dichloride, or any combination thereof; or alternatively, diethylaluminum chloride.

According to a further aspect and in any embodiment, the halogen-containing compound can comprise or be selected from a $C_1$-$C_{15}$ organic halide; alternatively, a $C_1$ to $C_{10}$ organic halide; or alternatively, a $C_1$ to $C_8$ organic halide. By way of example, according to this aspect, the halogen-containing compound can comprise or be selected from carbon tetrachloride, carbon tetrabromide, chloroform, bromoform, dichloromethane, dibromoethane, diiodomethane, chloromethane, bromomethane, iodomethane, dichloroethane, tetrachloroethane, trichloroacetone, hexachloroacetone, hexachlorocyclohexane, 1,3,5-trichlorobenzene, hexachlorobenzene, trityl chloride, benzyl chloride, benzyl bromide, benzyl iodide, chlorobenzene, bromobenzene, iodobenzene, hexafluorobenzene, or any combination thereof.

In an aspect, the catalyst system has a molar ratio of metal in the transition metal compound to metal in the metal alkyl ranging from 1:1 to 1:150; alternatively, 1:1 to 1:100; or alternatively, 1:9 to 1:21. In an embodiment, when the transition metal compound is a chromium compound (e.g. a chromium(III) carboxylate composition) and the metal alkyl is an alkylaluminum compound (e.g. triethylaluminum, diethylaluminum chloride, or a mixture thereof), the catalyst system may have a molar ratio of chromium to aluminum ranging from 1:1 to 1:150; alternatively, 1:1 to 1:100; or alternatively, 1:9 to 1:21.

In an aspect, the catalyst system has a molar ratio of nitrogen of the nitrogen containing compound to metal of the transition metal compound ranging from 1.0:1 to 4.0:1; alternatively from 1.5:1 to 3.7:1; alternatively from 1.5:1 to 2.5:1; alternatively from 2.0:1 to 3.7:1; alternatively from 2.5:1 to 3.5:1; or alternatively from 2.9:1 to 3.1:1. In an embodiment when the transition metal compound is a chromium compound (e.g. a chromium(III) carboxylate composition) and the nitrogen containing compound is a pyrrole (e.g. a 2,5-disubstituent pyrrole), the molar ratio of chromium to pyrrole typically ranges from 1.0:1 to 4.0:1; alternatively from 1.5:1 to 3.7:1; alternatively from 1.5:1 to 2.5:1; alternatively from 2.0:1 to 3.7:1; alternatively from 2.5:1 to 3.5:1; or alternatively from 2.9:1 to 3.1:1.

Oligomerization Process

The oligomerization catalyst system described herein may be utilized within an oligomerization process or a process to prepare and oligomerization product. Generally, the oligomerization process or process to prepare an oligomerization product comprises oligomerizing a feedstock olefin with the oligomerization catalyst as described herein.

In various embodiments and in accordance with one aspect, the feedstock olefin may be an alpha olefin and the oligomerization process can be an oligomerization process for preparing an alpha olefin oligomerization product; alternatively, the feedstock olefin can be a linear alpha olefin and the oligomerization process can be an oligomerization process for preparing an linear alpha olefin oligomerization product; or alternatively, the feedstock olefin can be a normal alpha olefin and the oligomerization process can be an oligomerization process for preparing a normal alpha olefin oligomerization product.

In one aspect, the oligomerization process for preparing an olefin oligomerization product may be an olefin trimerization process for preparing an olefin trimer product. In an embodiment, the trimerization feedstock olefin can be alpha olefin and the oligomerization process can be an trimerization process for preparing an alpha olefin trimerization product; alternatively, the trimerization feedstock olefin can be a linear alpha olefin and the oligomerization process can be an trimerization process for preparing an linear alpha olefin trimerization product; or alternatively, the trimerization feedstock olefin can be normal alpha olefin and the oligomerization process can be an trimerization process for preparing an normal alpha olefin trimerization product.

Generally, the feedstock olefin(s), alpha olefin(s), linear alpha olefin(s), or normal alpha olefin(s) may be $C_2$ to $C_{30}$, $C_2$ to $C_{16}$, or $C_2$ to $C_{10}$ olefin(s), alpha olefin(s), linear alpha olefin(s), or normal alpha olefin(s). In an embodiment, the olefin comprises, or consists essentially of ethylene. When the feedstock olefin consists essentially of ethylene, the oligomerization process can be an ethylene trimerization process, the trimer product can be 1-hexene, and the trimerization product comprises 1-hexene.

One composite catalyst system which may be used in the invention is the combination of chromium (III) ethylhexanoate, 2,5-diethylpyrrole, triethylaluminum, and diethylaluminum chloride. This composite catalyst system can be used, for example, to trimerize ethylene, forming 1-hexene. Other catalyst applicable catalyst systems are disclosed herein.

Usually, and in one aspect, contacting and/or reacting the chromium compound, pyrrole or pyrrole-containing compound, and metal alkyl is carried out in the presence of an unsaturated hydrocarbon. The unsaturated hydrocarbon can be any aromatic or aliphatic hydrocarbon, in a gas, liquid or solid state. To effect thorough contacting of the chromium compound, the pyrrole or pyrrole-containing compound, and metal alkyl, the unsaturated hydrocarbon may be in a liquid state. It will be understood, however, that the invention may be used in connection with appropriate catalyst systems, irrespective of the method of producing the catalyst system. In one aspect, the unsaturated hydrocarbon can be 1-hexene. Alternatively, the contacting and/or reacting the chromium compound, pyrrole or pyrrole-containing compound, and metal alkyl can be carried out in the absence of 1-hexene.

The unsaturated hydrocarbon can have any number of carbon atoms per molecule. Usually, the unsaturated hydrocarbon will comprise less than about 70 carbon atoms per molecule, or less than about 20 carbon atoms per molecule. Exemplary unsaturated, aliphatic hydrocarbon compounds include, but are not limited to, ethylene, 1-hexene, 1,3-butadiene, and mixtures thereof. In one aspect of the invention, the unsaturated aliphatic hydrocarbon compound is 1-hexene. If 1-hexene is the target oligomer to be formed, this may decrease the need for subsequent purification steps. Aromatic hydrocarbons that may be used as the unsaturated hydrocarbon for the catalyst system may include, but are not limited to, $C_6$ to $C_{50}$ aromatic compounds; alternatively, $C_6$ to $C_{30}$ aromatic compounds; alternatively, $C_6$ to $C_{18}$ aromatic compounds; or alternatively, $C_6$ to $C_{10}$ aromatic compounds. Exemplary aromatic hydrocarbons include, but are not limited to, benzene, toluene, ethylbenzene, xylene, mesitylene, hexamethylbenzene, and mixtures thereof. In an embodiment, the aromatic compound may be ethylbenzene. Unsaturated, aromatic hydrocarbons may be used to improve catalyst system stability, as well as produce a highly active and selective catalyst system. In one embodiment, the unsaturated hydrocarbon may be toluene; alternatively, ethyl benzene.

It should be recognized, however, that the reaction mixture comprising a chromium compound, the pyrrole or pyrrole-containing compound, metal alkyl and unsaturated hydrocarbon can contain additional components which do not adversely affect and can enhance the resultant catalyst system, such as, for example, transitions metals and/or halides.

The amount of aromatic compound that may be used in the preparation of the oligomerization catalyst system may be up to about 15 weight percent, based on the amount of solvent in the reactor, between about 0.001 and about 10 weight percent, or between about 0.01 and about 5 weight percent. Excess aromatic compound may inhibit catalyst system activity and insufficient aromatic compound may not stabilize the catalyst system. Generally, the moles of aromatic compound per mole of metal in the transition metal compound (e.g. chromium compound) in the catalyst system may be up to about 6,000, between about 10 and about 3,000, or between about 20 to 1,000 moles of aromatic compound per mole of metal (e.g. chromium compound) in the catalyst system.

Contacting of the aromatic compound and catalyst system may occur under any conditions sufficient to stabilize the catalyst system in the presence of heat. Generally, the temperatures for contacting may be between about −50° C. and about 70° C., between about −10° C. and about 70° C., or between about 5° C. and 30° C. Generally, contacting times may be less than about 5 hour, between about 0.01 seconds and about 4 hours, or between about 0.1 seconds and 3 hours. Longer contact times may not improve catalyst system stability, and shorter contact times may be insufficient to allow complete contacting of the aromatic compound and catalyst system and, therefore, may not be sufficient to stabilize the catalyst system. Any pressure which allows thorough contacting of the aromatic compound and catalyst system may be used. Generally, any pressure which can maintain the aromatic compound and catalyst system in liquid form may be used. The catalyst system preparation is generally performed under an inert atmosphere, such as nitrogen or argon, to decrease the amount of water vapor and oxygen present. Nitrogen is often used due to cost and availability. In addition to the discussion herein, other applicable examples of transition metal compounds and oligomerization catalyst systems, and their exemplary preparation, are provided in U.S. Pat. Nos. 6,133,495 and 7,384,886, which are hereby incorporated by reference in their entireties for all purposes.

The oligomerization reaction products, i.e., olefin trimers, can be prepared from the catalyst system of this invention by solution, slurry, and/or gas phase reaction techniques using conventional equipment and contacting processes. Contacting of the monomer or monomers with a catalyst system can be effected by any manner known in the art. One convenient method is to suspend the catalyst system in an organic medium and to agitate the mixture to maintain the catalyst system in solution throughout the trimerization process. Other known contacting methods can also be employed.

For example, a continuous-feed autoclave reactor with a fluid jacket or internal heat transfer coil and any suitable stirring mechanism, such as, for example, mechanical stirring or the sparging with an inert gas, typically nitrogen, may be used. In another embodiment, a loop reactor with mechanical stirring, such as, for example, a circulating pump, can be used. Alternatively, tubular reactions for carrying out the oligomerization may also be used in connection with the invention.

Alternatively, the trimerization process can be carried out in a slurry of the catalyst components in an inert medium or diluent which is the process medium. If employed, any number of aliphatic or aromatic solvents may be used as a diluent for the oligomerization reaction. Generally, the solvent will be stable with respect to the oligomerization process, e.g., having no double bonds that may be reacted during the oligomerization. Accordingly, the oligomerization solvent may generally be a stable aliphatic compound. The oligomerization solvent may be a $C_4$ to $C_{24}$ compound; alternatively, a $C_4$ to $C_{15}$ compound; or alternatively, a $C_4$ to $C_{10}$ aliphatic compound. Exemplary aliphatic compounds include but are not limited to isobutane, pentane, cyclohexane, methylcyclohexane, 1-hexene, heptane, and octane, among others. The choice of the oligomerization solvent may be made on the basis of convenience in processing. For example, isobutane may be chosen to be compatible with diluents used for the formation of polyolefins in a subsequent processing step. Since 1-hexene may be the reaction product of the oligomerization, it may be chosen as the oligomerization solvent to decrease the need for separation. Further, cyclohexane or methylcyclohexane may be chosen to solubilize the products made during the oligomerization. In an embodiment, the oligomerization solvent may be cyclohexane. Other diluents that may be available on site may also be used for the process.

In accordance with another embodiment of this invention, a slurry process can be carried out in a diluent (medium), which is a product of the olefin oligomerization process. Therefore, the choice of reactor diluent, or medium, is based on the selection of the initial olefin reactant. For example, if the oligomerization catalyst is used to trimerize ethylene to 1-hexene, the solvent for the oligomerization reaction would be 1-hexene. If ethylene and hexene were trimerized to produce decene, the oligomerization reaction solvent would be 1-hexene. If 1,3-butadiene was trimerized to 1,5-cyclooctadiene, the trimerization reactor solvent would be 1,3-butadiene or 1,5-cyclooctadiene, and so on.

Reaction temperatures and pressures can be any temperature and pressure which are suitable to trimerize the olefin reactants using said catalyst system. Generally, reaction temperatures are within a range of about −20° to about 250° C. In another aspect of the invention, reaction temperatures are within a range of about 60° to about 200° C. In yet another aspect, reaction temperatures are within a range of 80° to 150° C. Generally, reaction pressures are within a range of about atmospheric to about 2500 psig. In another aspect of the invention, reaction pressures may be within a range of about atmospheric to about 2500 psig; or alternatively, within a range of about atmospheric to about 1600 psig. In yet another aspect of the invention, the reaction pressure ranges between about 300 and about 900 psig. When the olefinic compound is ethylene, the reaction may be performed at an ethylene partial pressure ranging from 20 psi to 2500 psi; alternatively, from 100 psi to 2000; alternatively, from 200 psi to 1500 psi; or alternatively, from 300 psi to 1000 psi.

Too low of a reaction temperature can produce too much undesirable insoluble product, such as, for example, polymer, and too high of a temperature can cause deactivation of the catalyst system and isomerization of the reaction products. Too low of a reaction pressure can result in low catalyst system activity.

Optionally, hydrogen can be added to the reactor to accelerate the reaction and/or increase catalyst system activity. If desired, hydrogen also can be added to the reactor to suppress polymer production. When hydrogen is utilized, the hydrogen partial pressure may range from 2 psi to 100 psi; alternatively, 5 psi to 75 psi; or alternatively, 10 psi to 50 psi.

The contents of the reactor can be agitated or stirred by an inert gas (e.g. nitrogen) purge, by introducing the reactant, hydrogen, fluid medium, or catalyst or exhausting the effluent in a manner causing agitation, by mechanical or magnetic stirring, or in any other suitable manner.

The reaction usually is run continuously by steadily charging lower 1-olefin reactant(s), catalyst system, and process medium and removing the liquid contents of the reactor. For example, a continuous stirred tank reactor system can be employed that includes feed systems for catalyst system, reactant and medium and a discharge system for the effluent. Alternatively, a batch process can also be employed.

The trimerization reaction is an exothermic process, so the reaction temperature usually can be regulated by circulating cooling water through a jacket or heat transfer coil, thus transferring heat out of the reactor. It is important to be able to transfer heat efficiently out of the reactor, so the reactor can be effectively maintained at the desired reaction temperature. Another advantage of more effective heat transfer is that the trimerization reaction can be run at a higher throughput for a given temperature, which can improve production efficiency.

In an aspect, the reactor effluent is treated to deactivate the active catalyst system, and may further be treated to separate products, recycle the residual reactants, medium, and other components suitable for recycling, and dispose of any components that are not recycled.

When the oligomerization or trimerization process is deemed to be complete, the reactor effluent stream comprising solvent, olefin product(s), catalyst system, and some polymer and/or oligomer, may be contacted with an alcohol to deactivate the active catalyst system. Any alcohol which is soluble in the reactor effluent stream can be used. As used herein, the term "alcohol" includes monoalcohols, diols, and polyols. The alcohol may be selected by boiling point, molecular weight, or such that the alcohol will not azeotrope with the olefin monomer product. In some embodiments of the invention, the alcohol has a boiling point different from the olefin product in the reactor effluent stream. In an exemplary process, wherein the catalyst system is used to trimerize ethylene to 1-hexene, an alcohol with six or more carbon atoms per molecule may be used. In an embodiment the alcohol may be a $C_4$ to $C_{30}$, $C_4$ to $C_{20}$, or $C_4$ to $C_{12}$ alcohol. Such alcohols are easily removable from the 1-hexene olefin product. Exemplary alcohols include, but are not limited to, 1-hexanol, 2-hexanol, 3-hexanol, 2-ethyl-hexanol, 1-heptanol, 2-heptanol, 3-heptanol, 4-heptanol, 2-methyl-3-heptanol, 1-octanol, 2-octanol, 3-octanol, 4-octanol, 7-methyl-2-decanol, 1-decanol, 2-decanol, 3-decanol, 4-decanol, 5-decanol, 2-ethyl-1-decanol, and mixtures thereof. In an embodiment the alcohol may be 2-ethyl-1-hexanol.

Alternatively, a low-molecular-weight diol or polyol, for example ethylene glycol, can be used as a catalyst deactivation agent. Diols and polyols commonly have much higher boiling points than monoalcohols of comparable molecular weight, and thus can be separated more easily from 1-hexene.

The alcohol is added to the reactor effluent stream in an amount sufficient to quench and/or kill the catalyst system to inhibit, or halt: (1) production of undesirable solids, i.e., polymer; and/or (2) product purity degradation due to isomerization, in the product separation process.

After the catalyst system has been deactivated, olefin product(s), such as, for example, 1-hexene, can be removed. Any removal process can be used, including for example, distillation.

In an aspect, the oligomerization process or the process to prepare an oligomerization product comprising contacting the feedstock olefin with the oligomerization catalyst system described herein produces less polymer than the process using an oligomerization catalyst system using 2,5-dimethylpyrrole as the pyrrole compound. In an aspect wherein the oligomerization is an ethylene trimerization process, the catalyst system produces an oligomerization product having a greater selectivity to 1-hexene than an oligomerization catalyst system using 2,5-dimethylpyrrole as the pyrrole compound. In another aspect wherein the oligomerization is an ethylene trimerization process, the catalyst system produces a 1-hexene product having a greater purity than an oligomerization catalyst system using 2,5-dimethylpyrrole as the pyrrole compound. In an embodiment, the catalyst system produces an oligomerization selectivity to 1-hexene at least 0.5%, 1.0%, 1.5%, or 2.0% (absolute) greater than the oligomerization selectivity to 1-hexene product produced by an oligomerization catalyst system using 2,5-dimethylpyrrole as the pyrrole compound.

Articles Prepared in Accordance with this Disclosure

According to yet a further aspect of this disclosure and in the various embodiments, this disclosure encompasses various articles prepared from the olefin oligomers made by the disclosed process. For example and not as a limitation, this disclosure encompasses an article prepared from the oligomerization product produced from the process as described herein. For example, the article can be produced using the oligomerization product in which the oligomerization product is a copolymer. Also by way of example, the article can be produced using the oligomerization product in which the oligomerization product is a polyethylene copolymer and the oligomerization product is 1-hexene.

In a further aspect, and also by way of example, the article can be produced using the oligomerization product in which the oligomerization product is a high density polyethylene, a low density polyethylene, a medium density polyethylene, a linear low density polyethylene. In these aspects, the oligomerization product can be subjecting to blending, heating, melting, compounding, extruding, injection molding, precision molding, blow molding, forming a film, forming a coating, or any combination thereof, in forming the article.

Comparative Results

Figure 2:
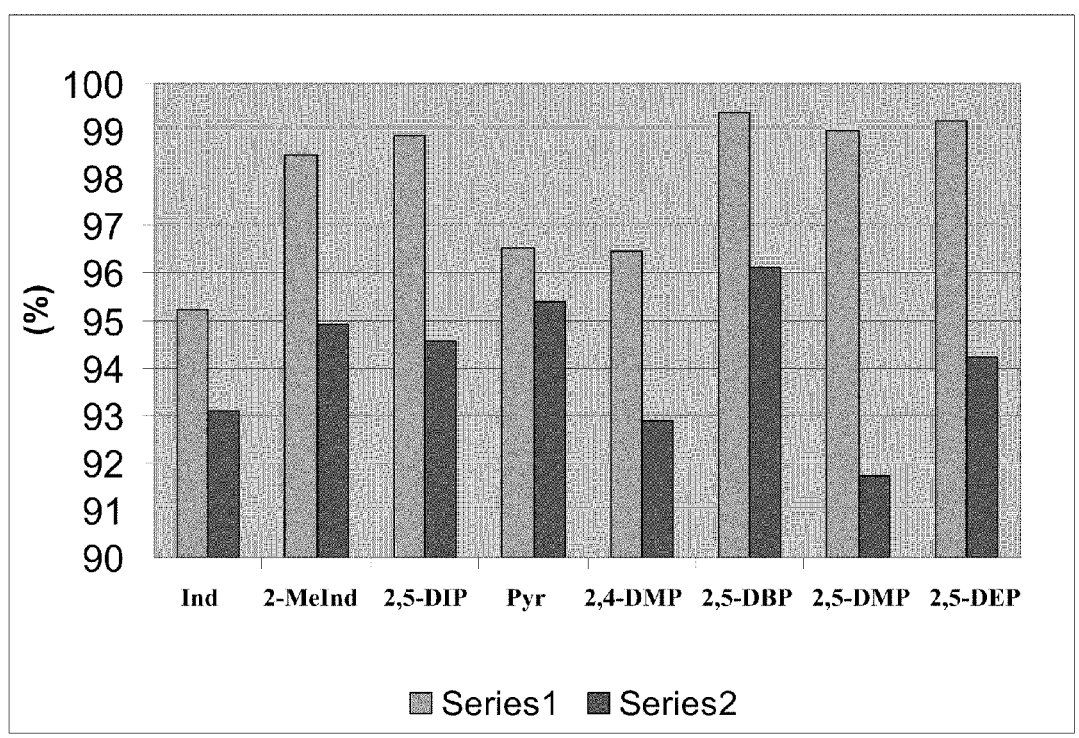
FIG. 2 provides a comparison of the 1-hexene purity (% of total C6 product) and C6 selectivity (% of total oligomerized product) for a variety of pyrrole compounds, reported at the temperature (° C.) of the highest observed productivity (g C6/g Cr), using the indicated pyrroles in the catalyst system disclosed herein.

Referring to FIGS. 1 and 2 and Tables 1 and 2, oligomerization studies were carried out to compare the catalytic behavior of different pyrroles under standard selective 1-hexene oligomerization reaction conditions, both to identify the various substituted pyrroles that provided reactive catalysts and to adjust the oligomerization conditions to determine upper levels of productivity for the various catalyst systems.

FIG. 1 illustrates a plot of the selective C6 productivities (g C6/g Cr) as a function of temperature (° C.), for chromium-based catalyst systems prepared using the following pyrroles: 2,5-dimethylpyrrole (2,5-DMP); 2,5-dibenzylpyrrole (2,5-DBP); 2,4-dimethylpyrrole (2,4-DMP); pyrrole; and 2,5-diethylpyrrole (2,5-DEP). As illustrated, each pyrrole provides a unique temperature profile to the catalyst system, which can be readily determined, and which can be used to establish optimum or desirable operating conditions for that particular catalyst. Generally, these studies revealed that the productivity of the 2,5-disubstituted pyrrole-based catalyst systems was more acutely affected by variations in temperature than other catalyst systems containing pyrroles that are not 2,5-disubstituted. Thus, the non-2,5-disubstituted pyrroles generally had a more flat temperature profile. In addition, the 2,5-DMP and 2,5-DEP showed high productivities at lower temperatures than the other pyrrole compounds tested. The data illustrate in FIG. 1 are provided in detail in Table 1.

The Table 2 and FIG. 2 data provide the 1-hexene purity (% 1-hexene of total C6 product), shown as Series 1 in FIG. 2, and the C6 selectivity (g C6/g Cr), shown as Series 2 in FIG. 2, for the indicate pyrrole compounds. These data are reported at the temperature (° C.) of the highest observed productivity (g C6/g Cr), which is also shown in Table 2, using the catalyst prepared according to the Examples. Thus, Table 2 illustrates how the productivities for catalyst systems prepared using the illustrated pyrroles, can provide dramatically different catalyst productivity values. Among other things, these data illustrate that 2,5-disubstituted pyrroles provide catalysts with higher productivity that those that contain non-2,5-disubstituted pyrroles. Thus, pyrroles that do not include substituents at both the 2- and 5-positions, regardless of the other substituents in the pyrrole, afford catalysts with lower activity. Generally, the catalytic productivity was observed to increase on moving from the non-substituted pyrrole, to the 2- or 5-substituted pyrrole (for example, 2,4-dimethylpyrrole), to the prototypical 2,5-dimethylpyrrole. Although some steric congestion at both the 2- and 5-positions appear to be useful, as evidence in the data for the 2,5-diethyl pyrrole and the 2,5-dimethylpyrrole, it appeared possible to exceed the sterically-optimum pyrrole substituents in the catalyst system. Thus, comparing the data for the 2,5-diethyl pyrrole and the 2,5-dimethylpyrrole with the 2,5-diisopropyl pyrrole illustrates how the more bulky substituents at these 2- and 5-positions successively lower or repress catalytic activity.

The FIG. 2 and Table 2 data further illustrates the highest 1-hexene purities and C6 selectivities generally are obtained with the 2,5-disubstituted pyrrole compounds at their highest measured catalyst productivity temperatures. As indicated in FIG. 2, the 2,5-DMP, 2,5-DEP, 2,5-DIP, and 2,5-DBP, as well as others such as 2-MeInd, would appear to offer a good combination of selectivity and purity. What is not illustrated by FIG. 2 is the productivity values for these respective catalysts. By comparing FIG. 2 data to the FIG. 1 plot, one can observe the benefits of 2,5-DMP and 2,5-DEP, and further observe the substantial improvement in selectivity that is attained with 2,5-DEP over 2,5-DMP.

Additional experiments were conducted to evaluate the potential effect of using fused-ring compounds such as indole or substituted indole as the nitrogen-containing compound in the catalysts systems. In these experiments (Example 5), 2-methyl-3-ethyl-5-methylpyrrole (productivity—21,700 g C6/g Cr) and 2-methylindole (productivity—3,500 g C6/g Cr), two compounds characterized by a similar substitution pattern, with similar steric congestion, provided very different productivities, differ by over six-fold. While not intending to be bound by theory, it is possible that the electron-withdrawing phenyl group fused to the pyrrole ring in 2-methyl indole produces a catalyst with low activity. As a further illustration, indole (productivity—800 g C6/g Cr), which also has an electron-withdrawing group fused to the pyrrole ring, produces a catalyst with almost an order of magnitude lower productivity than the pyrrole catalyst (productivity—6,400 g C6/g Cr). Again, while not intending to be theory-bound, it is possible that electronic effects may reduce the productivity of 2,5-dibenzylpyrrole (productivity—23,400 g C6/g Cr) as compared to that of 2,5-diethylpyrrole (productivity—75,800 g C6/g Cr), although increased steric effects may play a significant role.

General Disclosure Information

All publications and patents mentioned in this disclosure are incorporated herein by reference in their entireties, for the purpose of describing and disclosing the constructs and methodologies described in those publications, which might be used in connection with the methods of this disclosure. Any publications and patents discussed above and throughout the text are provided solely for their disclosure prior to the filing date of the present application. Nothing herein is to be construed as an admission that the inventors are not entitled to antedate such disclosure by virtue of prior invention.

Unless indicated otherwise, when a range of any type is disclosed or claimed, for example a range of the number of carbon atoms, molar ratios, temperatures, and the like, it is intended to disclose or claim Individually each possible number that such a range could reasonably encompass, including any sub-ranges encompassed therein. For example, when describing a range of the number of carbon atoms, each possible individual integral number and ranges between integral numbers of atoms that the range includes are encompassed therein. Thus, by disclosing a $C_1$ to $C_{10}$ alkyl group or an alkyl group having from 1 to 10 carbon atoms or "up to" 10 carbon atoms, Applicants' intent is to recite that the alkyl group can have 1, 2, 3, 4, 5, 6, 7, 8, 9, or 10 carbon atoms, and these methods of describing such a group are interchangeable. When describing a range of measurements such as molar ratios, every possible number that such a range could reasonably encompass can, for example, refer to values within the range with one significant digit more than is present in the end points of a range. In this example, a molar ratio between 1.03:1 and 1.12:1 includes individually molar ratios of 1.03:1, 1.04:1, 1.05:1, 1.06:1, 1.07:1, 1.08:1, 1.09:1, 1.10:1, 1.11:1, and 1.12:1. Applicants' intent is that these two methods of describing the range are interchangeable. Moreover, when a range of values is disclosed or claimed, which Applicants intent to reflect individually each possible number that such a range could reasonably encompass, Applicants also intend for the disclosure of a range to reflect, and be interchangeable with, disclosing any and all sub-ranges and combinations of sub-ranges encompassed therein. In this aspect, Applicants' disclosure of a $C_1$ to $C_{10}$ alkyl group is intended to literally encompass a $C_1$ to $C_6$ alkyl, a $C_4$ to $C_8$ alkyl, a $C_2$ to $C_7$ alkyl, a combination of a $C_1$ to $C_3$ and a $C_5$ to $C_7$ alkyl, and so forth. When describing a range in which the end points of the range have different numbers of significant digits, for example, a molar ratio from 1:1 to 1.2:1, every possible number that such a range could reasonably encompass can, for example, refer to values within the range with one significant digit more than is present in the end point of a range having the greatest number of significant digits, in this case 1.2:1. In this example, a molar ratio from 1:1 to 1.2:1 includes individually molar ratios of 1.01, 1.02, 1.03, 1.04, 1.05, 1.06, 1.07, 1.08, 1.09, 1.10, 1.11, 1.12, 1.13, 1.14, 1.15, 1.16, 1.17, 1.18, 1.19, and 1.20, all relative to 1, and any and all sub-ranges and combinations of sub-ranges encompassed therein. Accordingly, Applicants reserve the right to proviso out or exclude any individual members of any such group, including any sub-ranges or combinations of sub-ranges within the group, if for any reason Applicants choose to claim less than the full measure of the disclosure, for example, to account for a reference that Applicants are unaware of at the time of the filing of the application.

In any application before the United States Patent and Trademark Office, the Abstract of this application is provided for the purpose of satisfying the requirements of 37 C.F.R. §1.72 and the purpose stated in 37 C.F.R. §1.72(b) "to enable the United States Patent and Trademark Office and the public generally to determine quickly from a cursory inspection the nature and gist of the technical disclosure." Therefore, the Abstract of this application is not intended to be used to construe the scope of the claims or to limit the scope of the subject matter that is disclosed herein. Moreover, any headings that may be employed herein are also not intended to be used to construe the scope of the claims or to limit the scope of the subject matter that is disclosed herein. Any use of the past tense to describe an example otherwise indicated as constructive or prophetic is not intended to reflect that the constructive or prophetic example has actually been carried out.

For any particular compound disclosed herein, the general structure or name presented is also intended to encompasses all structural isomers, conformational isomers, and stereoisomers that may arise from a particular set of substituents, unless indicated otherwise. Thus, a general reference to a compound includes all structural isomers unless explicitly indicated otherwise; e.g. a general reference to butane include n-pentane, 2-methyl-butane, and 2,2-dimethylpropane. Additionally, the reference to a general structure or name encompasses all enantiomers, diastereomers, and other optical isomers whether in enantiomeric or racemic forms, as well as mixtures of stereoisomers, as the context permits or requires. For any particular formula or name that is presented, any general formula or name presented also encompasses all conformational isomers, regioisomers, and stereoisomers that may arise from a particular set of substituents.

The present disclosure is further illustrated by the following examples, which are not to be construed in any way as imposing limitations upon the scope thereof. On the contrary, it is to be clearly understood that resort may be had to various other aspects, embodiments, modifications, and equivalents thereof which, after reading the description herein, may suggest themselves to one of ordinary skill in the art without departing from the spirit of the present invention or the scope of the appended claims.

In the following examples, unless otherwise specified, the syntheses and preparations described therein were carried out under an inert atmosphere such as nitrogen and/or argon. Solvents were purchased from commercial sources and were typically dried prior to use. Unless otherwise specified, reagents were obtained from commercial sources.

EXAMPLES

General Experimental Procedures and Starting Materials

Unless specified otherwise, all reactions were performed under an inert atmosphere. All glassware was dried in an oven at 100° C. for 4 hr and brought into an inert atmosphere glove box (dry box) while warm.

All solvents were purchased from Aldrich as anhydrous grade and were stored over freshly activated 5 Å molecular sieves.

A. Pyrroles.

The following abbreviations are used for the pyrrole and indole ligands used herein: 2,4-dimethylpyrrole (2,4-DMP); 2,5-dimethylpyrrole (2,5-DMP or DMP); 2,5-diethylpyrrole (2,5-DEP or DEP); 2,5-dibenzylpyrrole (2,5-DBP or DBP); 2,5-diisopropylpyrrole (2,5-DIP or DIP); indole (Ind); 2-methylindole (2-MeInd); and pyrrole (Pyr).

The pyrrole compounds 2,4-dimethylpyrrole (2,4-DMP), indole, and 2-methylindole were purchased from Aldrich. Both indole (RP>99%) and 2-methylindole(RP 98%) were dried under vacuum at 110° C. for several hours without further purification (RP is the reported purity in wt %; MP is the measured purity in wt %). The 2,4-dimethylpyrrole (2,4-DMP, RP 97%) was purified by distillation under nitrogen (bp=165-167° C.) producing a colorless liquid (MP 99.5%).

Other pyrrole ligands, such as 2,5-diethylpyrrole (2,5-DEP), 2,5-dibenzylpyrrole (2,5-DBP) and 2,5-diisopropylpyrrole (2,5-DIP) were prepared by Chemstep (Carbon-Blanc, France). The 2,5-DIP(RP>95%) was received as a colorless liquid (MP 96.8%) and was used without further purification. 2,5-DEP(RP>97%) was distilled (MP 98.5%) prior to use. The 2,5-DBP (RP 82%) was received as an orange waxy material (MP 82.2%) and was used without further purification. The identity of all three new 2,5-dialkylpyrroles was confirmed by GC-MS.

B. Catalyst Preparation.

A catalyst solution was prepared using the standard procedure described here, in which the molar ratios of TEA (triethylaluminum) to DEAC (diethylaluminum chloride) to pyrrole compound to Cr were standardized to TEA:DEAC:pyrrole:Cr=11:8:3:1. Anhydrous, degassed ethylbenzene was added to a dry vial in a drybox. To this vial was added neat triethylaluminum (TEA) and neat diethylaluminum chloride (DEAC). The contents were mixed and allowed to stand for 15 minutes. The selected pyrrole was then slowly added, as gas evolution was observed in most cases. Chromium(III) 2-ethylhexanoate (7.25 wt % Cr in ethylbenzene) was used as the transition metal compound and was added slowly to the alkylaluminum/pyrrole solution with stirring. The catalyst solution was diluted to a concentration of 5.6 mg Cr/mL by adding an appropriate amount of ethylbenzene to constitute the active catalyst what was used as prepared. Orange colored solutions were observed for 2,4-DMP, 2-methylindole, and 2,5-DEP based catalyst, which are typical. 2,5-DBP initially produced an orange solution, but gradually precipitated a noticeable amount of grey solid over the course of 24 h. Both indole and pyrrole produced an orange solution with a white, fluffy solid which was removed by filtration. 2,5-DIP produced copious amounts of black precipitate suggesting that the catalyst solution was fairly unstable Example 1

Oligomerization Reactions

Oligomerization reaction studies comparing the catalytic behavior of different pyrroles under standard selective 1-hexene oligomerization reaction conditions, as follows. The standard reactor was a 1 L batch reactor, and oligomerization reactions were carried out at 115-117° C. under 50 psig $H_2$, and under 850 psig ethylene with ethylene uptake on demand, over a 30 minute run time, using 2.5 mg Cr, in 450 mL of cyclohexane. This methodology was useful for identifying various substituted pyrroles that provided reactive catalysts.

Example 2

1-Hexene Productivity as a Function of Temperature

The activity of selected substituted pyrroles and their catalyst systems as described were further investigated. Particularly, catalyst systems that employed 2,5-dibenzylpyrrole (2,5-DBP), 2,5-dimethylpyrrole (2,5-DMP), pyrrole itself, and 2,5-diethylpyrrole (2,5-DEP) were further investigated for their catalytic temperature profile, in which their activity and productivity were examined as a function of temperature. FIG. 1 illustrates a plot of total hexene productivity (g C6/g Cr) as a function of temperature (° C.), for chromium-based catalyst systems prepared using the following pyrroles: 2,5-dimethylpyrrole (2,5-DMP); 2,5-dibenzylpyrrole (2,5-DBP); 2,4-dimethylpyrrole (2,4-DMP); pyrrole; and 2,5-diethylpyrrole (2,5-DEP). The FIG. 1 productivity versus temperature data are listed in Table 1.

Among other things, these studies indicated that each pyrrole typically is characterized by its own unique temperature profile, which can be readily ascertained, and which can be used to establish optimum or desirable operating conditions. Generally, temperature dependence studies also revealed that the productivity of the 2,5-disubstituted pyrrole-based catalyst systems was more acutely affected by variations in temperature than other catalyst systems containing pyrroles that are not 2,5-disubstituted. Thus, the non-2,5-disubstituted pyrroles generally had a more flat temperature profile. Moreover, the 2,5-DMP and 2,5-DEP showed high productivities at lower temperatures than the other pyrrole compounds tested.

As illustrated in FIG. 1 and the data in Table 1, one consequence of comparing the productivities of various catalyst systems at a single standard temperature is that an incomplete comparative picture may result. For example, at higher temperatures (130-135° C.) the 2,5-DMP and 2,5-DEP catalyst systems provide somewhat comparable results (25,900 g C6/g Cr and 22,828 g C6/g Cr, respectively), but when compared at their respective highest productivities at about 92-95° C., this difference in productivity is exaggerated. At these lower temperatures, the 2,5-DMP (99,460 g C6/g Cr, 95° C.) is about 31% more productive than the corresponding 2,5-DEP catalyst system (75,757 g C6/g Cr, 92° C.).

Example 3

1-Hexene Productivity as a Function of Pyrrole Substitution

Table 2 and FIG. 2 provide a comparison of productivities (g C6/g Cr) for catalyst systems prepared according to Example 1, in which the catalyst system contain the indicated pyrroles. The temperature at the highest observed productivity is also shown.

Among other things, the data from this Example and FIG. 2 illustrate that 2,5-disubstituted pyrroles provide catalysts with generally higher productivity that those that contain non-2,5-disubstituted pyrroles, that is, pyrroles that do not include substituents at both the 2- and 5-positions, regardless of the other substituents in the pyrrole. Generally, the catalytic productivity was observed to increase on moving from the non-substituted pyrrole, to the 2- or 5-substituted pyrrole (for example, 2,4-dimethylpyrrole), to the prototypical 2,5-dimethylpyrrole. Although some steric congestion at both the 2- and 5-positions appear to be useful, too bulky substituents at these positions lower or repress catalytic activity (compare 2,5-DMP and 2,5-DEP with 2,5-DIP and with 2,5-DBP).

TABLE 1

Productivity (g C6/g Cr) versus temperature for a variety of pyrrole compounds. These data are illustrated in FIG. 1.

| Pyrrole Compound | Temperature (° C.) | Productivity (g C6/g Cr) |
| --- | --- | --- |
| DEP | 92 | 75,757 |
|  | 98 | 74,478 |
|  | 105 | 66,443 |
|  | 115 | 39,233 |
|  | 130 | 22,828 |
| 2,5-DMP | 95 | 99,460 |
|  | 105 | 87,300 |
|  | 115 | 60,660 |
|  | 125 | 43,000 |
|  | 135 | 25,900 |
| DBP | 45 | 2,792 |
|  | 70 | 15,021 |
|  | 85 | 23,411 |
|  | 115 | 9,325 |
| 2,4-DMP | 100 | 11,882 |
|  | 115 | 14,278 |
|  | 130 | 13,523 |
|  | 145 | 13,404 |
| pyrrole | 90 | 6,427 |
|  | 115 | 6,138 |
|  | 125 | 2,977 |

TABLE 2

1-Hexene purity (% of total C6 product) and C6 selectivity (% of total oligomerized product) for a variety of pyrrole compounds, reported at the temperature (° C.) of the highest observed productivity (g C6/g Cr), using the catalyst prepared according to the Examples.

| Pyrrole Compound | Productivity (g C6/g Cr) | Temperature (° C.) | 1-Hexene Purity (Series 1) | C6 Selectivity (Series 2) |
| --- | --- | --- | --- | --- |
| 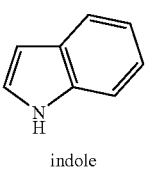 indole | 789 | 115 | 95.21 | 93.1 |
| 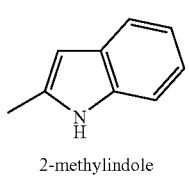 2-methylindole | 3,508 | 115 | 98.48 | 94.93 |

TABLE 2-continued

1-Hexene purity (% of total C6 product) and C6 selectivity (% of total oligomerized product) for a variety of pyrrole compounds, reported at the temperature (° C.) of the highest observed productivity (g C6/g Cr), using the catalyst prepared according to the Examples.

| Pyrrole Compound | Productivity (g C6/g Cr) | Temperature (° C.) | 1-Hexene Purity (Series 1) | C6 Selectivity (Series 2) |
|---|---|---|---|---|
| 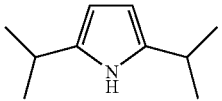<br>2,5-DIP | 3,631 | 115 | 98.89 | 94.57 |
| <br>pyrrole | 6,427 | 90 | 96.54 | 95.39 |
| 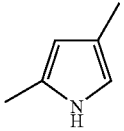<br>2,4-DMP | 14,284 | 115 | 96.46 | 92.89 |
| 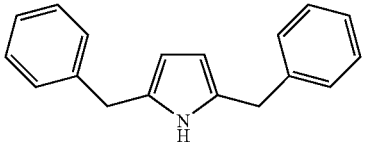<br>DBP | 23,411 | 85 | 99.38 | 96.13 |
| 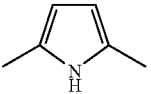<br>2,5-DMP | 99,456 | 95 | 99.02 | 91.72 |
| 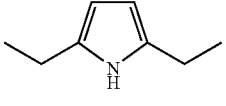<br>DEP | 75,757 | 92 | 99.20 | 94.21 |

Example 4

1-Hexene Purity and Selectivity as a Function of Pyrrole Substitution

The Table 2 and FIG. 2 data also provide the 1-hexene purity (% 1-hexene of total C6 product), shown as Series 1 in FIG. 2, and the C6 selectivity (% C6 of total oligomerized product), shown as Series 2 in FIG. 2, for the indicate pyrrole compounds. These data are reported at the temperature (° C.) of the highest observed productivity (g C6/g Cr), which is also shown in Table 2, using the catalyst prepared according to the Examples.

Among other things, the FIG. 2 and Table 2 data illustrates the highest 1-hexene purities and C6 selectivities generally are obtained with the 2,5-disubstituted pyrrole compounds at their highest measured catalyst productivity temperatures. As indicated in FIG. 2, the 2,5-DMP, 2,5-DEP, 2,5-DIP, and 2,5-DBP, as well as others such as 2-MeInd, would appear to offer a good combination of selectivity and purity. What is not illustrated by FIG. 2 is the productivity values for these respective catalysts. By comparing FIG. 2 data to the FIG. 1 plot, one can observe the benefits of 2,5-DMP and 2,5-DEP, and further observe the substantial improvement in selectivity that is attained with 2,5-DEP over 2,5-DMP.

Among other things, FIG. 3 illustrates that the three lowest values of purity are associated with the catalyst systems containing non-2,5-disubstituted pyrroles, specifically, indole, pyrrole, and 2,4-dimethylpyrrole (2,4-DMP), each of which provided purities of <96.5%.

Example 5

1-Hexene Productivity as a Function of Pyrrole-Based or Indole-Based Catalyst Systems Additional experiments were conducted to evaluate the potential effect of using fused-ring compounds such as indole or substituted indole as the nitrogen-containing compound in the catalysts systems. A comparison of productivities for catalyst systems prepared under identical conditions except for the pyrrole or indole compound.

2-Methyl-3-ethyl-5-methylpyrrole (21,700 g C6/g Cr) and 2-methylindole (3,500 g C6/g Cr) are characterized by a similar substitution pattern, with similar steric congestion, yet their productivities differ by over 600%. Moreover, indole (800 g C6/g Cr) produces a catalyst with almost an order of magnitude lower productivity than the pyrrole catalyst (6,400 g C6/g Cr). These data can be compared to the productivity of 2,5-dibenzylpyrrole (23,400 g C6/g Cr) as compared to that of 2,5-diethylpyrrole (75,800 g C6/g Cr), although increased steric effects may play a role in this observed productivity.

What is claimed is:

1. A catalyst system comprising:
   a) a chromium compound;
   b) 2,5-dibenzyl pyrrole; and
   c) an aluminum alkyl.

2. The catalyst system according to claim 1, wherein the chromium compound is a chromium(II) or chromium(III) halide, 1,3-diketonate, or carboxylate.

3. The catalyst system according to claim 1, wherein the chromium compound is a chromium(II) or chromium(III) carboxylate, wherein each carboxylate is a $C_4$ to $C_{19}$ carboxylate.

4. The catalyst system according to claim 1, wherein the chromium compound is selected from chromium(III) 2-ethylhexanoate, chromium(III) octanoate, chromium(III) 2,2,6,6,-tetramethylheptanedionate, chromium(III) naphthenate, chromium(III) acetate, chromium(III) propionate, chromium(III) butyrate, chromium(III) neopentanoate, chromium(III) laurate, chromium(III) stearate, chromium(III) oxalate, chromium(II) bis(2-ethylhexanoate), chromium(II) acetate, chromium(II) propionate, chromium(II) butyrate, chromium(II) neopentanoate, chromium(II) laurate, chromium(II) stearate, chromium(II) oxalate, or any combination thereof.

5. The catalyst system according to claim 1, wherein the chromium compound comprises chromium(III) 2-ethylhexanoate.

6. The catalyst system according to claim 1, wherein the aluminum alkyl comprises triethylaluminum.

7. The catalyst system according to claim 1, wherein the aluminum alkyl comprises a mixture of triethylaluminum and diethylaluminum chloride.

8. The catalyst system according to claim 1, further comprising a halogen-containing compound selected from a metal halide, an alkyl metal halide, or an organic halide.

9. The catalyst system according to claim 1, wherein the chromium compound is a chromium(II) or chromium(III) carboxylate, wherein each carboxylate is a $C_4$ to $C_{19}$ carboxylate; and the aluminum alkyl comprises a mixture of triethylaluminum and diethylaluminum chloride.

10. The catalyst system according to claim 1, wherein the chromium compound comprises chromium(III) 2-ethylhexanoate; and the aluminum alkyl comprises a mixture of triethylaluminum and diethylaluminum chloride.

11. The catalyst system according to claim 1, wherein the catalyst system has a catalyst system productivity greater than 30,000 g $C_6$/g Cr, under ethylene oligomerization conditions.

12. A process for preparing a catalyst system, comprising contacting:
   a) a chromium compound;
   b) 2,5-dibenzyl pyrrole; and
   c) an aluminum alkyl.

13. The process of claim 12, wherein the chromium compound, the 2,5-dibenzyl pyrrole, and the aluminum alkyl are contacted in the presence of an unsaturated compound.

14. The process of claim 13, wherein the unsaturated compound is a $C_6$ to $C_{18}$ aromatic compound.

15. The process of claim 12, wherein the chromium compound is a chromium(II) or chromium(III) carboxylate, wherein each carboxylate is a $C_4$ to $C_{19}$ carboxylate; and the aluminum alkyl comprises a mixture of triethylaluminum and diethylaluminum chloride.

16. An oligomerization process comprising:
   a) contacting a feedstock olefin with the catalyst system of claim 1; and
   b) oligomerizing the olefin under oligomerization conditions to form an oligomerization product.

17. The oligomerization process of claim 16, wherein the feedstock olefin is ethylene; the oligomerization product comprises 1-hexene; the chromium compound is a chromium(II) or chromium(III) carboxylate, wherein each carboxylate is a $C_4$ to $C_{19}$ carboxylate; and the aluminum alkyl comprises a mixture of triethylaluminum and diethylaluminum chloride.

18. The oligomerization process of claim 17, wherein the process provides a higher selectivity to 1-hexene than the process using 2,5-dimethylpyrrole as the pyrrole compound.

19. The oligomerization process of claim 17, wherein the process provides a higher purity 1-hexene product than the process using 2,5-dimethylpyrrole as the pyrrole compound.

* * * * *